US010112741B2

(12) United States Patent
Wetsch

(10) Patent No.: US 10,112,741 B2
(45) Date of Patent: Oct. 30, 2018

(54) INFLATABLE PACKAGING WITH ADHESIVE SEALS

(71) Applicant: PREGIS INNOVATIVE PACKAGING LLC, Deerfield, IL (US)

(72) Inventor: Thomas D. Wetsch, St. Charles, IL (US)

(73) Assignee: PREGIS INNOVATIVE PACKAGING LLC, Deerfield, IL (US)

(*) Notice: Subject to any disclaimer, the term of this patent is extended or adjusted under 35 U.S.C. 154(b) by 0 days.

(21) Appl. No.: 14/937,857

(22) Filed: Nov. 10, 2015

(65) Prior Publication Data

US 2016/0137382 A1  May 19, 2016

Related U.S. Application Data

(60) Provisional application No. 62/077,815, filed on Nov. 10, 2014, provisional application No. 62/103,504, filed on Jan. 14, 2015.

(51) Int. Cl.
B65D 33/01 (2006.01)
B65D 33/00 (2006.01)
(Continued)

(52) U.S. Cl.
CPC .............. B65D 33/01 (2013.01); B29C 65/14 (2013.01); B29C 65/48 (2013.01); B65D 33/008 (2013.01); B65D 33/06 (2013.01); B65D 33/08 (2013.01); B65D 81/03 (2013.01); B65D 81/052 (2013.01); B65D 81/263 (2013.01); B65D 85/34 (2013.01); A23V 2002/00 (2013.01); B29L 2031/7128 (2013.01)

(58) Field of Classification Search
CPC . B29C 65/14; B29C 65/48; B29L 2031/2128; B31B 1/64; B31B 1/84; B65B 11/00; B65D 33/008; B65D 33/01; B65D 33/06; B65D 81/02; B65D 81/03; B65D 81/05; B65D 81/052; B65D 81/07; B65D 81/263; B65D 85/30; B65D 85/34; B65D 33/08
USPC .............................................. 206/522; 383/3
See application file for complete search history.

(56) References Cited

U.S. PATENT DOCUMENTS 3,398,501 A   8/1968  Aninger
4,465,188 A   8/1984  Soroka et al.
(Continued)

FOREIGN PATENT DOCUMENTS

CN    107107477 A     8/2017
JP    9-142541 A  *  6/1997  ............. B65D 33/01
JP    2003-118771 A   4/2003

OTHER PUBLICATIONS

International Search Report and Written Opinion received for PCT/US2015/060048 dated Mar. 4, 2016.

Primary Examiner — Bryon Gehman
(74) Attorney, Agent, or Firm — Dorsey & Whitney LLP

(57) ABSTRACT

An inflatable packaging element is provided herein. The inflatable packaging element comprises first and second film plies sealed to each other by a seal to cooperatively form a flexible structure. The seal defines an inflation chamber between the first and second plies that is inflatable with and configured to contain a fluid. The seal is formed using an adhesive.

33 Claims, 14 Drawing Sheets

(51) Int. Cl.
   *B65D 33/08*     (2006.01)
   *B29C 65/14*     (2006.01)
   *B29C 65/48*     (2006.01)
   *B65D 81/05*     (2006.01)
   *B65D 33/06*     (2006.01)
   *B65D 81/03*     (2006.01)
   *B65D 81/26*     (2006.01)
   *B65D 85/34*     (2006.01)
   *B29L 31/00*     (2006.01)

(56) References Cited

U.S. PATENT DOCUMENTS

| | | | |
|---|---|---|---|
| 5,469,966 A * | 11/1995 | Boyer | B65D 31/14 206/522 |
| 5,620,096 A | 4/1997 | Pozzo | |
| 5,647,480 A | 7/1997 | Insley | |
| 6,076,677 A | 6/2000 | Pozzo et al. | |
| 6,190,710 B1 | 2/2001 | Nir et al. | |
| 6,244,441 B1 * | 6/2001 | Ahlgren | B32B 27/322 206/522 |
| 6,283,296 B1 | 9/2001 | Newman | |
| 7,585,528 B2 * | 9/2009 | Ferri | B65D 81/052 206/522 |
| 7,757,854 B2 | 7/2010 | Morris et al. | |
| 7,938,264 B2 | 5/2011 | Yoshifusa | |
| 8,016,110 B2 * | 9/2011 | Zhang | B65D 81/03 206/522 |
| 8,061,110 B2 | 11/2011 | Wetsch | |
| 8,128,770 B2 | 3/2012 | Wetsch et al. | |
| 8,272,510 B2 | 9/2012 | Frayne et al. | |
| 8,404,071 B2 * | 3/2013 | Cope | B29C 66/91921 493/264 |
| 9,004,758 B2 * | 4/2015 | Frayne | B31D 5/0073 206/522 |
| 2005/0247592 A1 | 11/2005 | Peper | |
| 2008/0035519 A1 | 2/2008 | Swartz et al. | |
| 2009/0117236 A1 | 5/2009 | Watzke et al. | |
| 2009/0169134 A1 | 7/2009 | Hsu | |
| 2010/0101970 A1 | 4/2010 | Frayne et al. | |
| 2010/0199610 A1 | 8/2010 | Komatsu et al. | |
| 2011/0139671 A1 * | 6/2011 | Edwards | B32B 3/28 206/524.6 |
| 2011/0172072 A1 | 7/2011 | Wetsch et al. | |
| 2011/0230322 A1 | 9/2011 | Zhang et al. | |
| 2014/0260094 A1 | 9/2014 | Wehrmann | |
| 2014/0261752 A1 | 9/2014 | Wetsch | |
| 2014/0346079 A1 | 11/2014 | Gess | |
| 2014/0363545 A1 | 12/2014 | Veternik et al. | |
| 2015/0291335 A1 * | 10/2015 | Wetsch | B65D 81/052 428/12 |
| 2016/0137383 A1 | 5/2016 | Wetsch et al. | |

\* cited by examiner

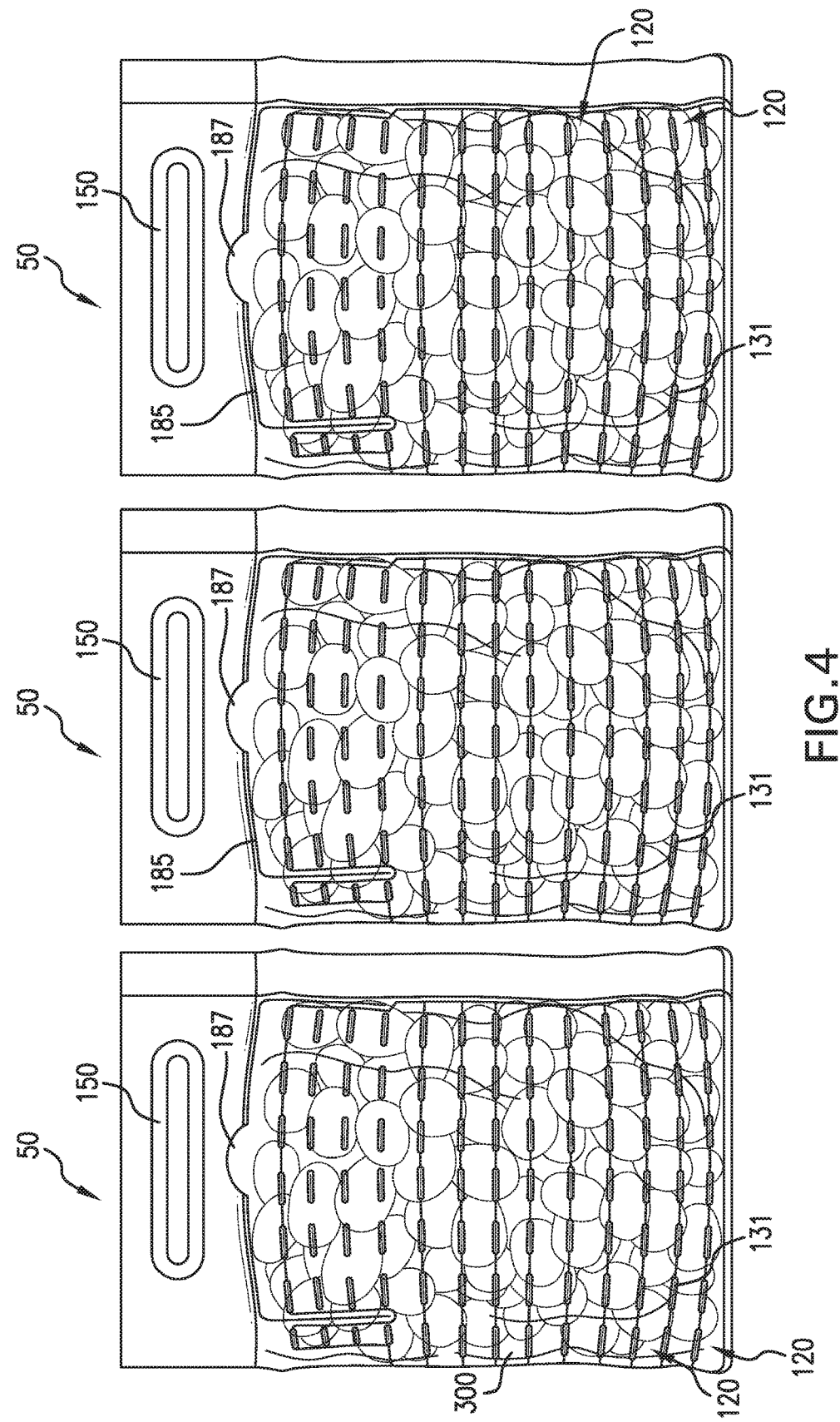

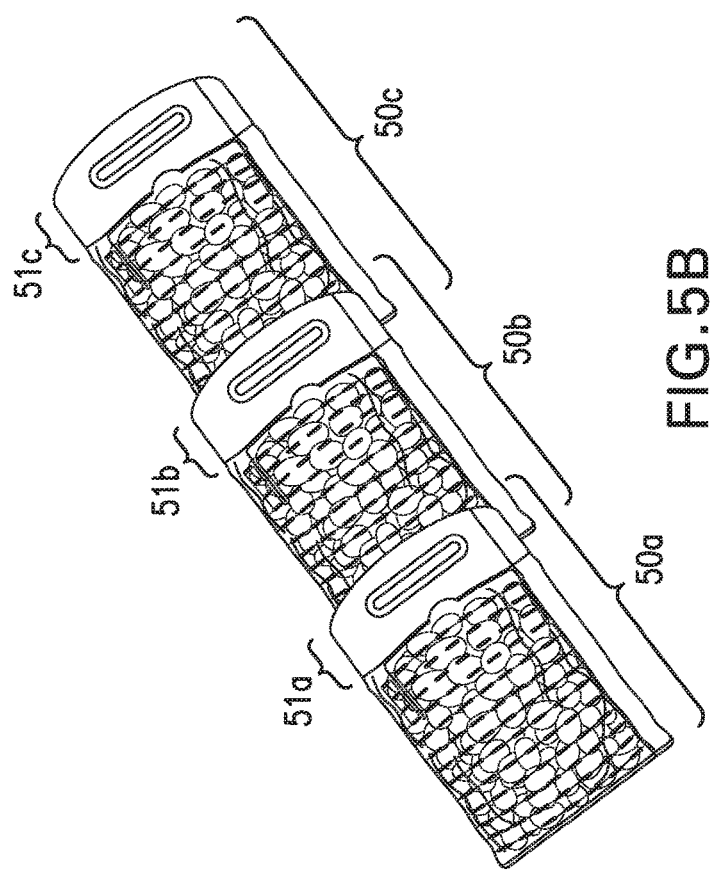
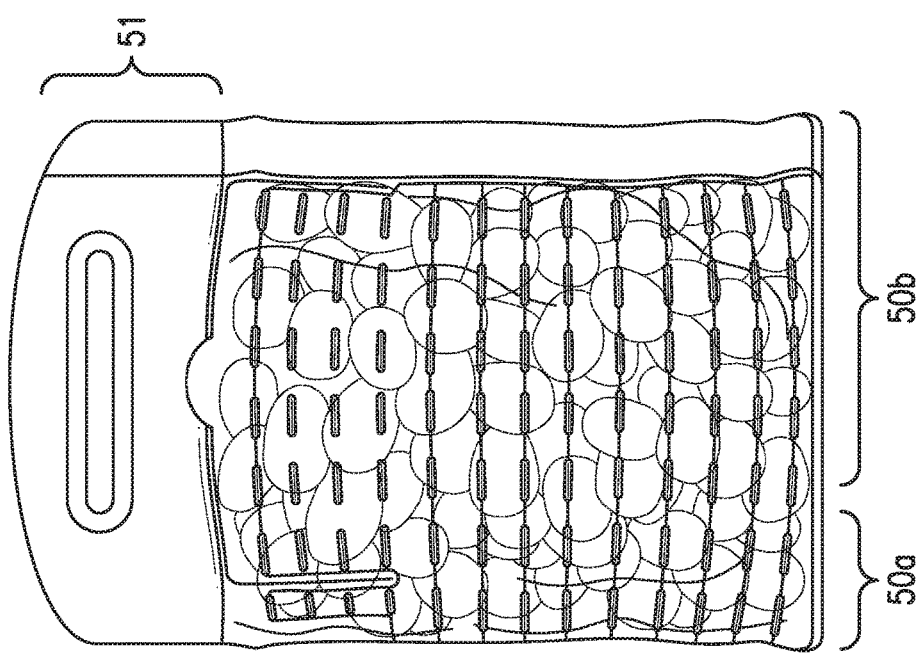

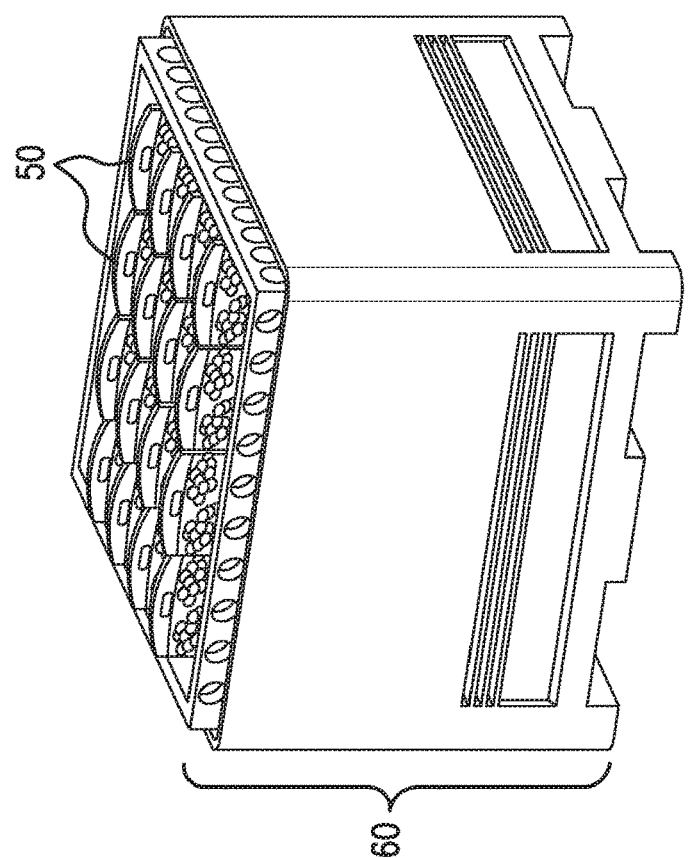
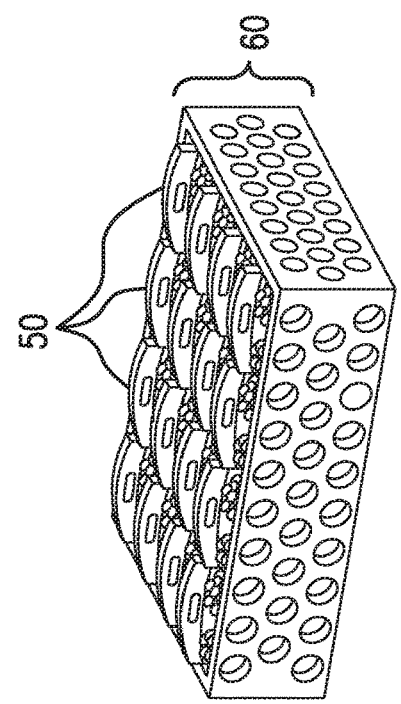

INFLATABLE PACKAGING WITH ADHESIVE SEALS

CROSS-REFERENCE TO RELATED APPLICATIONS

The present application claims the benefit of priority of U.S. Provisional Patent Application No. 62/077,815, filed Nov. 10, 2014, entitled "Inflatable Produce Packaging," and No. 62/103,504, filed Jan. 14, 2015, entitled "Inflatable Produce Packaging," which are hereby incorporated herein by reference in their entireties. The present application is with U.S. patent application Ser. No. 14/937,869, filed Nov. 10, 2015, entitled "Inflatable Produce Packaging," and U.S. patent application Ser. No. 14/937,860, filed Nov. 10, 2015, entitled "Inflatable Packaging with Apertures", which are hereby incorporated by reference in their entireties.

TECHNICAL FIELD

The disclosure herein is directed to shipping containers, particularly flexible shipping containers in agriculture.

BACKGROUND

The agriculture industry encounters regular challenges related to preserving and shipping produce prone to spoilage. Typically, produce is shipped in thin film vented PE plastic bags, corrugated containers or trays, mesh bags or vented clamshells. When most produce, such as fruit, is shipped it can be abused in transit. This transportation abuse can accelerate the ripening of fruit or damage the fruit, which also leads to accelerated ripening, browning and/or bruising of the surrounding fruit. This bruising is a result of oxidation of compounds within the fruit. To limit this damage, chemical barriers are sometimes employed. One example of a chemical barrier is citric acid, which is highly reactive to oxygen and thus reduces the oxidation of the produce itself. In addition to oxidation, damage to produce exposes the nutrients within the produce cells. This exposure leads to the colonization of microbes such as *E. coli* and salmonella, as well as molds, fungi, and yeasts. To reduce this colonization, produce is sometimes dehydrated slightly. It is believed that the dehydration improves the threshold at which the product bruises. In some cases, produce is refrigerated to a temperature of 32 degrees Fahrenheit to slow the ripening process or extend the shelf life during storage or transportation.

Frequent causes of produce bruising include impact between closely packed pieces of produce and between produce and shipping containers. Larger and more massive produce can also be damaged due to the weight of one piece of produce on another. Visco-elastic properties of some produce can worsen the damage. Damage also has a tendency to release certain gases, such as ethylene, which causes some produce to increase the rate or ripening. For example, climacteric fruits continue ripening after picking and thus are susceptible to accelerated ripening by ethylene. Leaves, such as lettuce, are also susceptible to this ripening process. It is believed that ethylene affects the genes that make enzymes. The enzymes then catalyze reactions to alter the characteristics of the produce. The action of the enzymes causes the ripening responses. Chlorophyll is broken down and sometimes new pigments are made so that the fruit skin changes color from green to red, yellow, or blue. Acids are broken down so that the fruit changes from sour to neutral. The degradation of starch by amylase produces sugar. This reduces the mealy (floury) quality and increases juiciness. The breakdown of pectin, thanks to pectinase between the fruit cells, unglues them so they can slip past each other. That results in a softer fruit. Enzymes also break down large organic molecules into smaller ones that can be volatile (evaporate into the air) and that we can detect as an aroma. Producing the ethylene also causes more ethylene to be produced. During the shipping process the ripening and spoiling of fruit is generally considered to be negative. For example in grapes there is not only the bruising but once the grape breaks from the stem or twists on the stem the open wound begins to oxidize and start to decay because the flesh is exposed to mold spores that are in the atmosphere. By added protection during shipping produce shelf life can be extended up to 60 days. It's not necessarily how fast it will accelerate but the fact that there are berries that are breaking down the buyer won't be interested in buying the product making it worthless.

In order to reduce ripening and spoiling, numerous solutions have been offered. Some of these solutions include partial dehydration, air circulation around the fruit, open storage systems (e.g. open box), chemical prevention (e.g. citric acid), modifying equipment and handling procedure, or pre-conditioning fruit (hydration/temp); cold temperature storage; charcoal scrubbing of the produce atmosphere to absorb ethylene use of carbon dioxide and nitrogen as ripening inhibitors; physical separation with cardboard (or similar) dividers; and other process. These processes tend to be costly, cumbersome, or undesirable to the quality of the produce. As such, improved systems and methods may be desirable in the industry.

SUMMARY

In some embodiments, an inflatable packaging element is provided herein. The inflatable packaging element comprises first and second film plies sealed to each other by a seal to cooperatively form a flexible structure. The seal defines an inflation chamber between the first and second plies that is inflatable with and configured to contain a fluid. The seal is formed using an adhesive.

In some embodiments, a method of producing an inflatable packaging element is provided. The method includes adhering together a first film ply and a second film with a seal to cooperatively form a flexible structure. The seal defines an inflation chamber between the first and second plies that is inflatable with and configured to contain a fluid. The seal is formed using an adhesive.

In some embodiments, an inflatable packaging element is provided. The inflatable packaging element includes a first wall defined by a first film ply and a second film ply that is sealed to the first ply by one or more ply seal. The one or more ply seal defines an inflation region between the first and second plies, and the inflation region is inflatable with and configured to contain a fluid. The inflatable packaging element includes a second wall, and one or more wall seal that seals together the first and second walls to form a container. At least one of the one or more ply seal or the one or more wall seal is formed using an adhesive.

In some embodiments, embodiments, a method of producing an inflatable packaging elements is provided. The method comprises sealing a first film ply and a second film ply together with one or more ply seals to form a inflation chamber therebetween and create a first wall. The method includes inflating the inflation chamber with a fluid such that the fluid is contained within the inflation chamber, and sealing the first wall to a second wall with one or more wall seals to form a container. At least one of the one or more ply seals or the one or more wall seal is formed using an adhesive.

BRIEF DESCRIPTION OF THE DRAWINGS

FIG. 4 shows a flexible structure of FIG. 1 that is inflated and packaged to contain produce;

FIG. 5A-B show flexible structures that are inflated and packaged to contain produce;

FIG. 6A-B show flexible structures that are inflated and packaged to contain produce, and stored in crates;

DETAILED DESCRIPTION

The present disclosure is related to protective packaging and systems and methods for converting uninflated material into inflated cushions that may be used as cushioning or protection for packaging and shipping goods, particularly produce or other agricultural products.

Illustrative embodiments will now be described to provide an overall understanding of the disclosure. Those of ordinary skill in the art will understand that the disclosed embodiments can be adapted and modified to provide alternative embodiments for other applications, and those other additions and modifications can be made to the disclosure without departing from the scope of the present disclosure. For example, features of the illustrative embodiments can be combined, separated, interchanged, and/or rearranged to generate other embodiments. Such modifications and variations are intended to be included within the scope of the present disclosure. Similarly, the subject matter discussed herein may also be incorporated into the various system disclosed in the incorporated references. Embodiments are not meant to stand alone, but may be combined with other embodiments from other referenced applications or various other embodiments disclosed herein.

Figure 1:
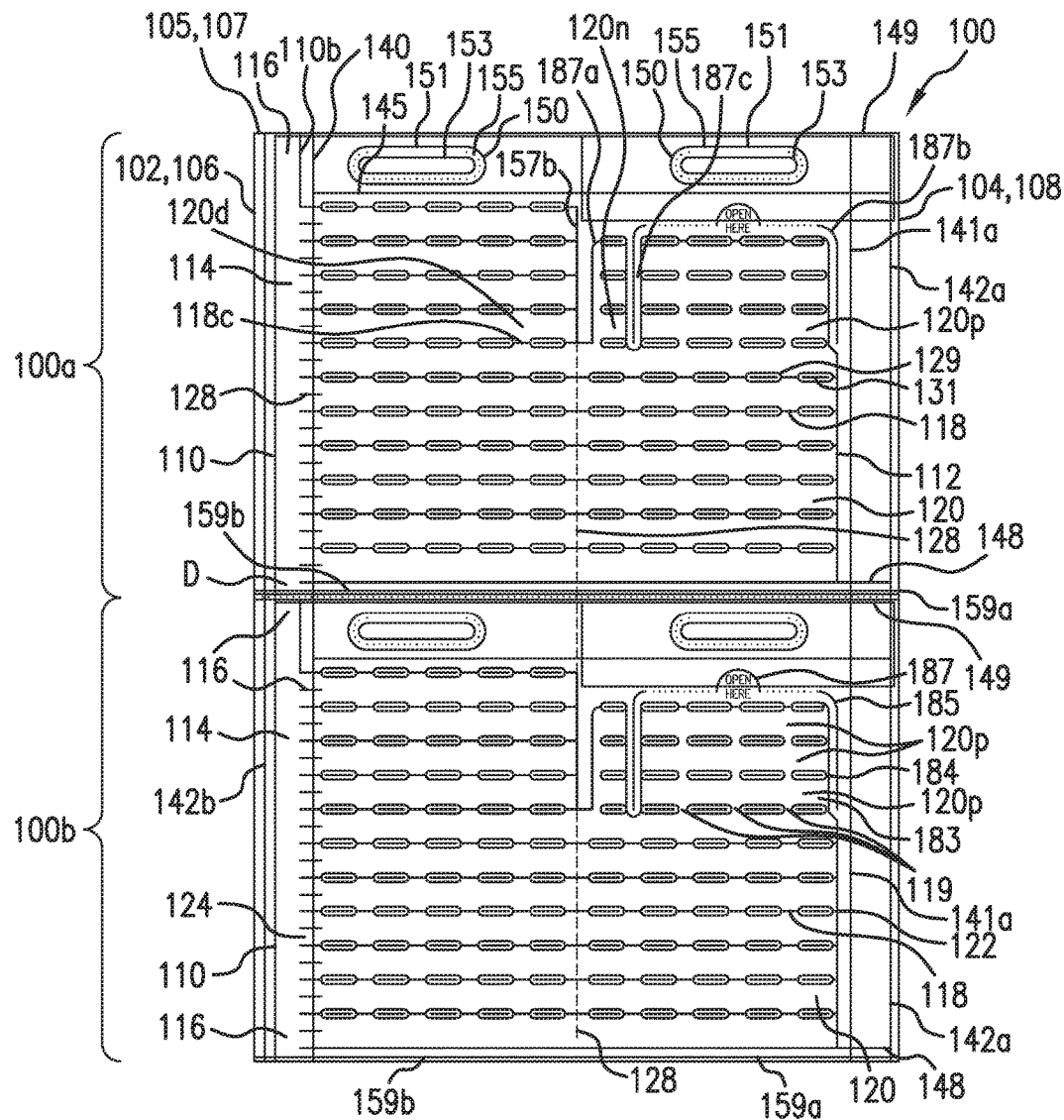
FIG. 1 shows a sheet of two flexible structures, according to an embodiment.

FIG. 1 is a schematic illustration of a flexible structure 100 in accordance with various embodiments. The flexible structure may be formed in any of a variety of manners. For example, a plurality of interconnected flexible structures (e.g. 100a, 100b) may form a continuous sheet.

The continuous sheet may be separated by perforations or other regions of weakness to facilitate separating individual protective packaging units 100a, 100b from each other. Lines of weakness 149 may extend transversely to separate units that are disposed in series longitudinally with respect to each other. When separated, the broken lines of weakness define longitudinal ends of the units 100a, 100b. These lines of weakness may be formed as perforations or similar structures that allow a user to easily separate units by tearing the units apart with his or her hands. As used herein, perforations may be small ticks in the material that cause a tear to be directed to the next tick in the material. This tick-to-tick tear may then propagate along the length of the perforation allowing for simple separation. The lines of weakness and specifically perforations can be distinguished from apertures discussed herein, as the lines of weakness are directed to structures that cause a continued propagation of a separable feature, whereas the apertures do not do so unless otherwise specifically noted.

Figure 2B:
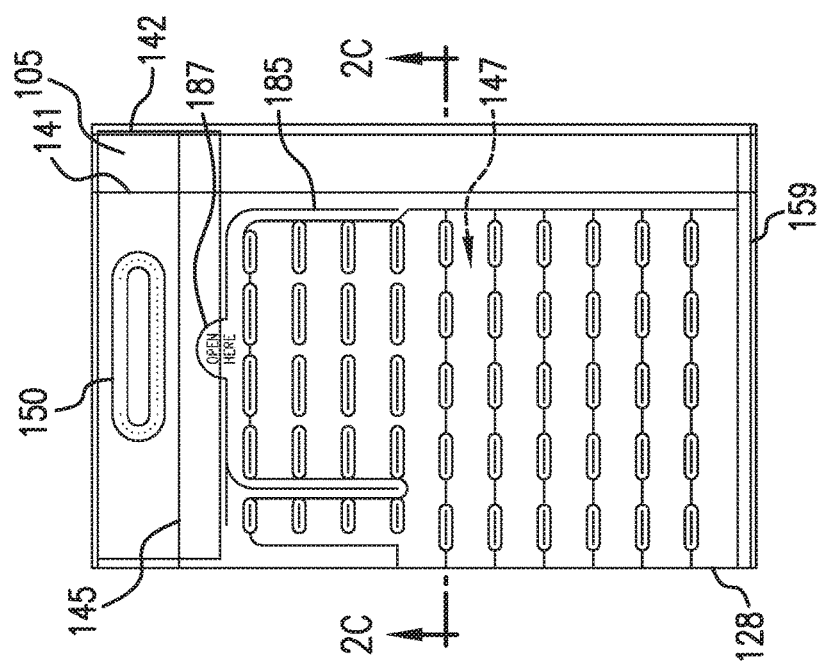
FIGS. 2A-B show one of the flexible structure of FIG. 1 being folded.
Figure 2A:
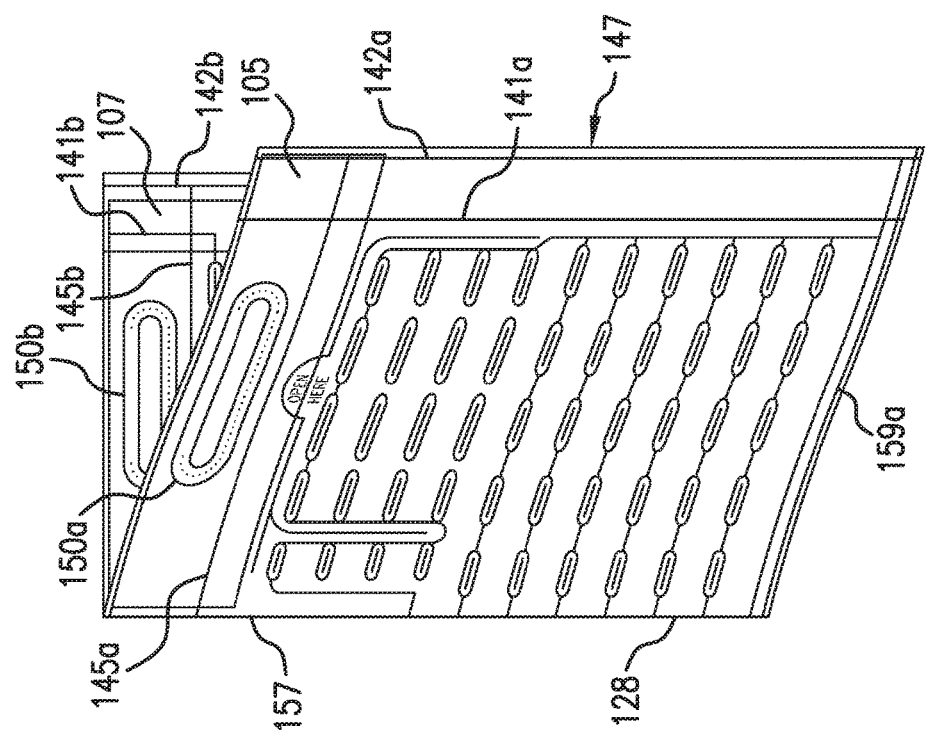
Figure 2C:
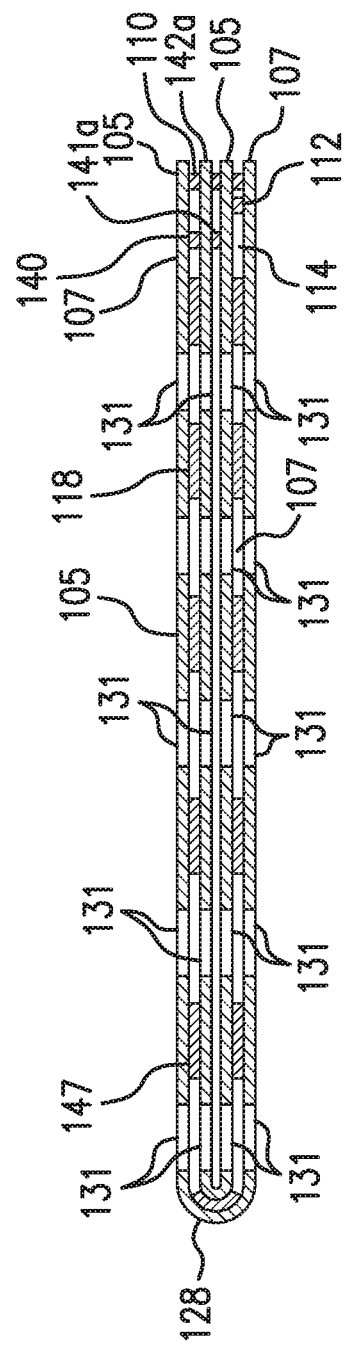
FIG. 2C shows a cross section of the flexible structure taken along the line 2C-2C in FIG. 2B.

FIG. 1 shows an embodiment of separate flexible structures (e.g. 100a or 100b) that can each form a container 50, as illustrated in FIG. 2B. FIG. 2A shows an example of forming a flexible structure 100a, 100b into a container 50, according to an embodiment. The container may be operable to surround, hold, separate, and/or protect contents stored within the container. Alternatively, the flexible structure 100 may be utilized in the flat form illustrated in FIG. 1. In this form the flexible structure 100 may be utilized as a divider. The divider may be positioned between layers of goods and thereby separate different quantities of the goods. For example, the divider may be laid in a box with a layer of produce on top. Another divider may be laid on top of the first layer with more produce on top and so-on. In this way, one layer of produce is divided from another layer of produce protecting the various layers from one-another and outside conditions. Whether the flexible layer is formed into container 50, used in its flat form, or used in another form, each of the various features discussed herein may be applicable.

In accordance with various embodiments, the flexible structure 100 may include multiple plies 105, 107 of film. The first film ply 105 has a first longitudinal edge 102 and a second longitudinal edge 104, and a second film ply 107 has a first longitudinal edge 106 and a second longitudinal edge 108. The second film ply 107 may be aligned to be overlapping and generally coextensive with the first film ply 105, i.e., at least respective first longitudinal edges 102,106 are aligned with each other and/or second longitudinal edges 104,108 are aligned with each other. In some embodiments, the plies 105,107 are partially overlapping with inflatable areas in the region of overlap. The plies 105,107 may be joined to define a first longitudinal edge 110 and a second longitudinal edge 112 of the film 100. The first and second plies 105,107 can be formed from a single sheet of web material, a flattened tube of web material with one edge slit, or two sheets of web material. For example, the first and second plies 105,107 can include a single sheet of web material that is folded to define the joined second edges 104,108 (e.g., "c-fold film"). As another example, the first and second plies 105,107 can include a tube of web material (e.g., a flatten tube) that is slit along the aligned first longitudinal edges 102,106. In embodiments, the first and second plies 105,107 include two independent sheets of web material joined, sealed, or otherwise attached together along the aligned second edges 104, 108.

In accordance with various embodiments, the structure 100 may be flexible. For example, structure 100 may be sufficiently flexible so that it easily bends under its own weight. The structure 100 may be sufficiently flexible so that a user can bend it into different shapes without permanently distorting, cracking, or breaking it. A thermoform plastic package is not a flexible material but more a semi-rigid material that does not absorb impacts from shock and vibration.

The disclosed film ply 105,107 may comprise a monolayer or multilayer film. The one or more layers may include a polymer. In cases in which the film ply 105,107 comprises a multilayer film, the multiple layers can include polymers of differing compositions. In some embodiments, the disclosed layers may be selected from ethylene, amide, or vinyl polymers, copolymers, and combinations thereof. The disclosed polymers can be polar or non-polar. The disclosed ethylene polymers may be substantially non-polar forms of polyethylene. In many cases the ethylene polymer may be a polyolefin made from copolymerization of ethylene and another olefin monomer, for example an alpha-olefin. The ethylene polymer may be selected from low, medium, or high density polyethylene, or a combination thereof. In some cases, the density of various polyethylenes varies, but in many cases the density of low density polyethylene may be, for example, from about 0.905 or lower to about 0.930 g/cm3, the density of medium density polyethylene may be, for example, from about 0.930 to about 0.940 g/cm3, and high density polyethylene may be, for example, about 0.940 to about 0.965 g/cm3 or greater. The ethylene polymer may be selected from linear low density polyethylene (LLDPE), metallocene linear low density polyethylene (mLLDPE), high density polyethylene (HDPE), medium density polyethylene (MDPE), and low density polyethylene (LDPE).

In some embodiments, the polar polymer may be a non-polar polyethylene which may be modified to impart a polar characteristic. In other embodiments, the polar polymer is an ionomer (e.g. copolymers of ethylene and meth acrylic acid, E/MAA), a high vinyl acetate content EVA copolymer, or other polymer with polar characteristics. In some embodiments, the modified polyethylene may be anhydride modified polyethylene. In some embodiments, the maleic anhydride is grafted onto the olefin polymer or copolymer. Modified polyethylene polymers may react rapidly upon coextruding with polyamide and other ethylene containing polymers (e.g., EVOH). In some cases, a layer or sublayer comprising the modified polyethylene may form covalent bonds, hydrogen bonds and/or dipole-dipole interactions with other layers or sublayers, for example sublayers or layers comprising a barrier layer. In many embodiments, modification of a polyethylene polymer may increase the number of atoms on the polyethylene that are available for bonding. For example, modification of polyethylene with maleic anhydride adds acetyl groups to the polyethylene, which may then bond with polar groups of the barrier layer, for example, hydrogen atoms on a nylon backbone. Modified polyethylene may also form bonds with other groups on a nylon backbone as well as polar groups of other barrier layers, for example, alcohol groups on EVOH. In some embodiments, a modified polyethylene may form chain entanglements and/or van der Waals interactions with an unmodified polyethylene.

Mixtures of ethylene and other molecules may also be used. For example, ethylene vinyl alcohol (EVOH) is a copolymer of ethylene and vinyl alcohol. EVOH has a polar character and can aid in creating a gas barrier. EVOH may be prepared by polymerization of ethylene and vinyl acetate to give the ethylene vinyl acetate (EVA) copolymer followed by hydrolysis. EVOH can be obtained by saponification of an ethylene-vinyl acetate copolymer. The ethylene-vinyl acetate copolymer can be produced by a known polymerization, such as solution polymerization, suspension polymerization, emulsion polymerization and the like, and saponification of ethylene-vinyl acetate copolymer can be also carried out by a known method. Typically, EVA resins are produced via high pressure autoclave and tubular processes.

Polyamide is a high molecular weight polymer having amide linkages along the molecular chain structure. Polyamide is a polar polymer. Nylon polyamides, which are synthetic polyamides, have favorable physical properties of high strength, stiffness, abrasion and chemical resistance, and low permeability to gas, for example oxygen.

Other materials and constructions can be used. The disclosed flexible structure 100 can be rolled on a hollow tube, a solid core, or folded in a fan-folded box, or in another desired form for storage and shipment.

In accordance with various embodiments, the plies, walls, structures, etc. discussed herein may be sealed together to form the described structures with a process such as adhesively bonding, friction, welding, fusion, heat sealing, laser sealing, and ultrasonic welding. For example, the plies 105, 107 may be sealed together forming an interior inflation chamber according to any known method. In an embodiment, the plies are sealed together using an adhesive. Furthermore the flexible structure 100 already formed of plies 105, 107 may be sealed to itself or another flexible structure 100 in order to form other structures such as for example container 50. For example, the plies or structure may be heat-sealed together or adhesively sealed together. An adhesive that is operable to seal the inflation chambers sufficiently to contain gas under shipping pressures may be suitable. These pressures may be caused by stacking the flexible structure 100 under multiple layers of the shipped product. In some embodiments, the adhesive may be cured by exposing the adhesive to an electromagnetic radiation. The adhesive may be sensitive to electromagnetic radiations in specific areas of the electromagnetic radiation spectrum. For example, the adhesive may be an ultraviolet light (UV) curable adhesive. For example, heat sealing the adhesive may be applied to one or both the film plies 105, 107, the plies may then be laid over top of one another and then sealed together by applying an ultraviolet light seal. This and similar adhesives and methods are described in more detail in U.S. Pat. No. 8,404,071 which is hereby incorporated by reference in its entirety. The adhesive may also be a pressure sensitive or any other adhesive. As discussed herein any of the seals may be made by just heat sealing, just adhesive sealing, both types of sealing, or any other type of sealing. The adhesive may be a UV curable laminating adhesive that may be used in connection with some implementations of wet lamination. For example, the adhesive may be a UV curable, flexo type low-odor laminating adhesive for film to film UV wet laminating applications. The adhesive can have a Brookfield Viscosity between about 700-1000 cps at 77 degrees Farenheit. The adhesive can have a density equal to or about equal to 8.6 pounds per gallon. The adhesive can have a low odor and/or a clear liquid appearance. The adhesive can have a solids content of 100%. The adhesive can have a cure speed between about 150-220 FT/MIN with 1×300 watt/in lamps. The adhesive can have a coverage equal to or about equal to 5300 FT/GAL at 0.3 mil thickness. The adhesive can have a cure absorbance irradiance equal to or about equal to 1.3 Wcm$^2$. These adhesives cure well at fast speeds to provide a durable high quality bond with specific films, such as treated LLDPE, LDPE, and metallocene catalyzed LLDPE, and polypropylene. These adhesives have strong adhesion to both films and some papers. They are also cationic based and will not cure well in-line over aqueous or solvent amine containing inks. In some embodiments, the adhesive can have a coating thickness of approximately 0.2 to 0.5 mil. A typical anilox in the 150-200 Q range can provide the appropriate coat weight. Best results may be achieved on smooth films and some papers. Excellent results have been obtained with polyethylene and polypropylene films. Film surface treatment to 40-45 dynes/cm can be used to improve adhesion with low surface energy films.

In accordance with various embodiments, plies 105, 107 may be sealed together with seals 118. The seals 118 may be sufficiently continuous to hold a gas injected into the flexible structure 100. In this manner, each of the flexible structures (e.g. 100a, 100b) may be inflated to form a cushion or pillow. The cushion or pillow may take the form of a structured container 50 (see e.g. FIGS. 2A-B) or flat sheet as shown in FIG. 1. Either form may be utilized to separate a first produce quantity from a second produce quantity. For example, as a flat sheet an inflated flexible structure may be placed between layers of produce. As a structured container 50, produce may be protected by placing produce within the inflated structure.

As shown in FIG. 1, the web 100 can include a series of transverse seals 118 disposed along the longitudinal extent of the web 100. Each transverse seal 118 extends from the longitudinal seal 112 towards a longitudinal inflation region, which may be, for example, an inflation channel 114 that has a substantially or entirely closed periphery about its longitudinal axis, except for where it directs gas between the plies 105, 107 of film, to receive a longitudinal inflation nozzle therein. The transverse seals 118 may be straight as shown or may be curved, zig-zag or form any geometry's or shapes suitable to the application. Alternatively, the inflation region can be provided by an open lateral edge, such as with flaps that are held over a transverse nozzle to blow gas between the film plies. In the embodiment shown, the inflation channel 114 is closed on a side opposite the inflation chambers 120 by first longitudinal seal 110. Each transverse seal 118 has a first end 122 proximate the second longitudinal seal 112 and a second end 124 spaced a transverse dimension d from the first longitudinal seal 110 of the film 100. An inflation chamber 120 is defined within a boundary formed by various seals operable to enclose a gas within. For example the inflation chamber 120 may be defined by the longitudinal seal 112 or longitudinal seal 140 and pair of adjacent transverse seals 118. The chamber may be closed by longitudinal seal 140. The flexible structure 100 may be inflated in a flat form or after it has by formed into a container structure such as container 50. In one example, the flexible structure is formed by sealing plies 105, 107 together. The structure is then inflated and after inflating it is formed into container 50. In another example, the flexible structure is formed by sealing plies 105, 107 together. The structure is then formed into container 50 and sealed in this form. After forming into container 50 the structure is inflated and the inflation is sealed.

Each transverse seal 118 embodied in FIG. 1 may extend substantially perpendicular to the second longitudinal seal 112. It is appreciated, however, that other arrangements of the transverse seals 118 are also possible. For example, in some embodiments, the transverse seals 118 have undulating or zigzag patterns. The transverse seals 118 may be continuous and/or discontinuous. The transverse seals 118 as well as the sealed longitudinal edges 110,112 can be formed from any of a variety of techniques known to those of ordinary skill in the art, such as those sealing techniques discussed above.

An inflation region such as a closed passageway, which can be a longitudinal inflation channel 114, can be provided. The longitudinal inflation channel 114, as shown in FIG. 1, is disposed between the second end 124 of the transverse seals 118 and the first longitudinal edge 110 of the film. The longitudinal inflation channel 114 may extend longitudinally along the longitudinal side 110 and an inflation opening 116 is disposed on at least one end of the longitudinal inflation channel 114. The longitudinal inflation channel 114 has a transverse width D. In the embodiment of FIG. 1, the transverse width D is substantially the same distance as the transverse dimension d between the longitudinal edge 110 and second ends 124. It is appreciated, however, that in other configurations other suitable transverse width D sizes can be used. In accordance with other embodiments the longitudinal inflation channel may extend up the center of the flexible structure 100 with openings extending from either side of the longitudinal inflation channel into inflation chambers. In such an example, the longitudinal inflation channel may form the boundary between two walls of container 50. Alternatively, the central longitudinal inflation channel may be formed in a single wall with each separate wall of container 50 having its own separate longitudinal inflation channel. In various embodiments, each separate flexible structure, such as 100a may be inflated without inflating other structures such as 100b. Again this is independent of whether the structure is formed into a container. The structures may be inflated with a nozzle as discussed below or the structure may include one way valves allowing for inflation. In various embodiments, the flexible structures, such as 100a and 100b may be continuously inflated. This may be done through a whole roll, stack, or other quantities of such structure and again this is independent of whether the structure is formed into a container or not.

The second longitudinal edge 112 and transverse seals 118 cooperatively define boundaries of inflatable chambers 120. In various embodiments, the inflatable chambers 120 may further include intermediate seals 128. The intermediate seals 128 may seal the plies 105, 107 to one another at intermediate areas in the chamber 120. As shown in FIG. 1A, intermediate seals 128 may be transversely aligned across the chamber 120 or may be longitudinally aligned across the chamber 120. The intermediate seals may allow gasses to pass by the seals such that they do not block off the chamber, thereby allowing the entire chamber to inflate. The intermediate seals may provide a variety of functions. In various embodiments, the intermediate seals 128 may create bendable lines that allow for a more flexible web 100 that can be easily bent or folded. Such flexibility allows for the film 100 to wrap around regular and irregular shaped objects. In various embodiments, the intermediate seals 128 may provide multiple openings into the chambers 120 from the inflation channel 114. See e.g. intermediate seals 128 that are transversely directed between transverse seals along the left side of FIG. 1, proximate the inflation channel 114. In various embodiments, the intermediate seals 128 may provide a folding line to fold the plies 105,107 back over top of one another. See, e.g., intermediate seals 128 that are longitudinally directed between transverse seals longitudinally along the center of the film 100 in FIG. 1.

In accordance with various embodiments, the transverse seals 118 may include intermediate seal portion 129. Intermediate seal portion 129 may have a larger area with respect to the area of seal 118. Intermediate seal portion 129 may be an alternative seal configuration along the length of transverse seals 118 operable to serve an additional function over the transverse seal 118. For example, intermediate seal portion 129 may seal a sufficient area of the plies 105, 107 to locate an aperture therein without piercing the inflation chambers 120. Additionally or alternatively, intermediate seal portion 129 may provide bendable lines for additional flexibility or bendable locations for modifying the shape of the film 100.

The intermediate seal portion 129 may be a seal wherein the plies 105,107 are attached to one another. The intermediate seal portion 129 may be a section where narrow seals such as a continuation of seal 118 define the intermediate seal portion 129. The intermediate seal portion 129 may be an area where a wider solid seal is formed along seal 118 (i.e. the area where the plies 105, 107 are attached may be a continuous solid seal without an unattached area of plies 105, 107 within the center of the intermediate seal portion 129). This solid seal may form a stiffer section of the web 100. The intermediate seal portion 129 may be an area where a seal such as partial seal 118 encloses a section of unattached plies 105, 107. This non-solid seal configuration of intermediate seal portion 129 (i.e. where the plies 105, 107 are unattached) may be a more flexible web 100.

Figure 3B:
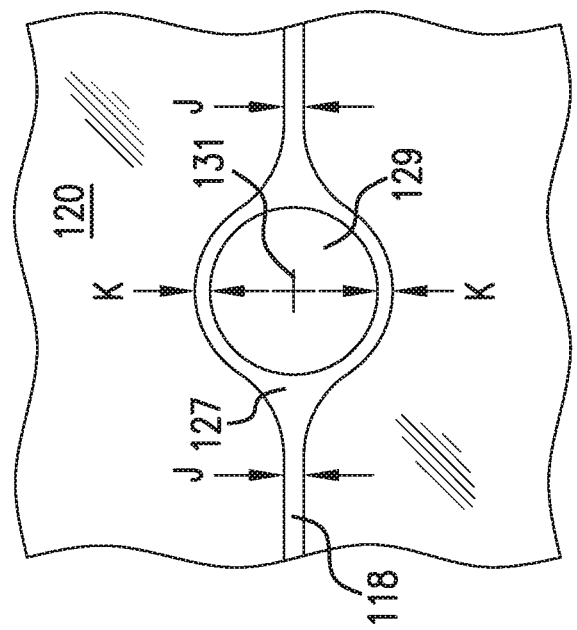
FIGS. 3A-B show detailed views of seal portions, according to an embodiment.
Figure 3A:
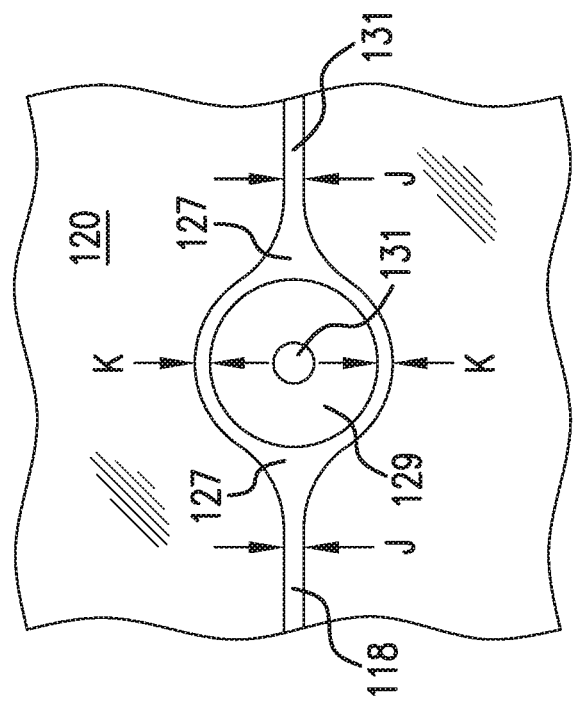

In accordance with various embodiments, the seal 118 may include narrow portions (e.g. seal 118) and wide portions (e.g. seals 129.) The seal 118 may branch off to form two seal braches defining the intermediate seal portion 129. This point of widening from seal 118 to seal portion 129 may be at a transition 127. The transition may have a width that is wider than the seal portion 129. For example, the seal portion 129 may have a width of J. The transition 127 may widen from width J. Width J may be between 1½ times wider to 10 times wider than seal 118. For example, the transition 127 may be 5 times wider. The transition may then narrow again to width K above and below the transition area. Or the transition 127 may widen to the entire width of the transition area and then narrow back to width J as the seal 118 continues. The transition 127 may be concave as viewed from the chamber 120. This may allow the transition to be gradual or not sharp. Although in some embodiments, sharp transitions can be used. In accordance with various embodiments, intermediate seal portion 129 may be circular, oval, triangular, trapezoidal, polygon or any other shape. As shown in FIG. 3A-B, the intermediate seal portion 129 may be a circle. The intermediate seal portion 129 may be seal between the first layer and the second layer. Alternatively, the intermediate seal portion 129 may be an unattached portion of the first layer and the second layer bounded on all sides by a seal that does seal the first layer and the second layer, e.g. seal 118 and/or transitions 127.

In accordance with various embodiments, a gradual transition may be used to reduce stresses at the intermediate seal portion 129. The transition 127 may reduce the tendency of the intermediate seal portion 129 from separating due to stresses placed on the film 100. In various embodiments, the film 100 whether formed as a container (e.g. container 50) or utilized as an inflatable sheet may have areas of increased pressure. The pressure may arise from jagged items that contact the film 100, bending of the film 100, or crushing the film 100 causing an increase in pressure. Under this increase in pressure, a sharp transition may be a stress riser that can cause a tear or separation of the seal or film 100. An example of a sharp transition may be if the intermediate seal portion 129 and the seal 118 were positioned at 90 degree angles relative to one another. In another example the transition may be gradual with a curve flowing from seal 118 to seal 129 through transition 127 with a blunt curve on the interior portion of the seal 129. In some instances, there may be no interior portion of the seal 129. The widened portion may be solid seal all the way across. In other instances the seal 129 may have an unattached interior, being bounded on each side by seal portions 129.

In accordance with various embodiments, the interior portion of the seal 129 may include an aperture 131. The aperture 131 may reduce or eliminate the stress on the seals. The aperture may allow the material within the seal 129, (whether this material includes attached or unattached plies) to flex and distort thereby reducing the tendency of the seal to tear or separate.

In accordance with various embodiments, the apertures 131 may be located within seal portions that are independent of the transverse seals. These seals may be entirely surrounded by an air chamber. The seals located within panel 183 are one example. Seal portions may also be located between transverse seals along air chambers.

In accordance with various embodiments, the film 100 may have a plurality of apertures 131 interspersed throughout the film 100. The apertures 131 may provide one or more of stress relief (as discussed above) or venting. The apertures 131 may be through holes that extend through walls. Each aperture 131 may be a single hole, e.g. extending through a single surface such as a single layer or two layers merged at a seal line, or each of the apertures 131 may be more than one hole. For example, the apertures 131 may be a first hole through a first layer 105 that is generally aligned with a second hole through the second layer 107. In some embodiments, the apertures may be misaligned with sufficient air between the plies to allow venting though the apertures.

The apertures may be structured such that they do not promote a continuous tear between one another or across a significant portion of the flexible structure. For example, this means a tear in one aperture is unlikely to propagate into the next aperture and so on. This structure may be accomplished by the apertures location relative to one another, the location of each aperture relative to another feature, or the apertures shape. For example, the apertures may be located such that the space between apertures is operable to prevent or limit successive tearing between apertures. For example, the space between apertures may be greater than twice the apertures width, three times the aperture width, or four times the width of the aperture. The obvious shape is apertures can be shaped to allow air passage and venting and designed are not designed to promote separation of the chambers or so they can be broken apart. Also, the apertures can be designed to spread open during inflation and can vary in width depending on the required ventilation desired. In another example, the apertures may be circular in shape such that aperture shape is operable to prevent or limit successive tearing between apertures such that they do not form a perforation line. In another example, the apertures are separated from one another by seal boundaries such that the seal boundaries prevent or limit successive tearing between apertures.

In accordance with various embodiments, the apertures 131 may function as vents allowing gasses to circulate through the film 100. For example, in embodiments in which the film 100 forms a bag or other sealed container, apertures 131 may form vents. For example, the apertures 131 may allow ethylene produced by organic material contained therein to escape and fresh air to enter. These apertures 131 may take the form of any shape. They may be elongated slits as shown in FIGS. 1-2 and 3E-3F. The slits may have zero or insignificant width such as the width produced by a razor cut with shape end points. The slit may be an elongated hole having an apparent width. They may be polygons. They may have rounded ends as shown in FIG. 3A, or the aperture may be free of sharp edges. The aperture may have blunt edges. The aperture may be an "X" or cross as shown in FIG. 3B.

In accordance with various embodiments, the intermediate seal portion 129 may be configured to reinforce the aperture 131 passing through plies 105 and 107. As discussed above, the intermediate seal portion 129 may be a solid seal across its area (see e.g. FIGS. 3C-3H) or intermediate seal portion 129 may be separate seal portions outlining an unattached area (see e.g. FIGS. 3A-B). The aperture 131 may pass through a center portion of the intermediate seal portion 129. In this way, the intermediate seal portion 129 prevents or limits the aperture 131 from piercing through either of the adjacent inflation chambers 120. Thus the film 100 is operable to provide venting through the apertures 131 and cushion via the adjacent inflation chambers 120.

Figure 3C:
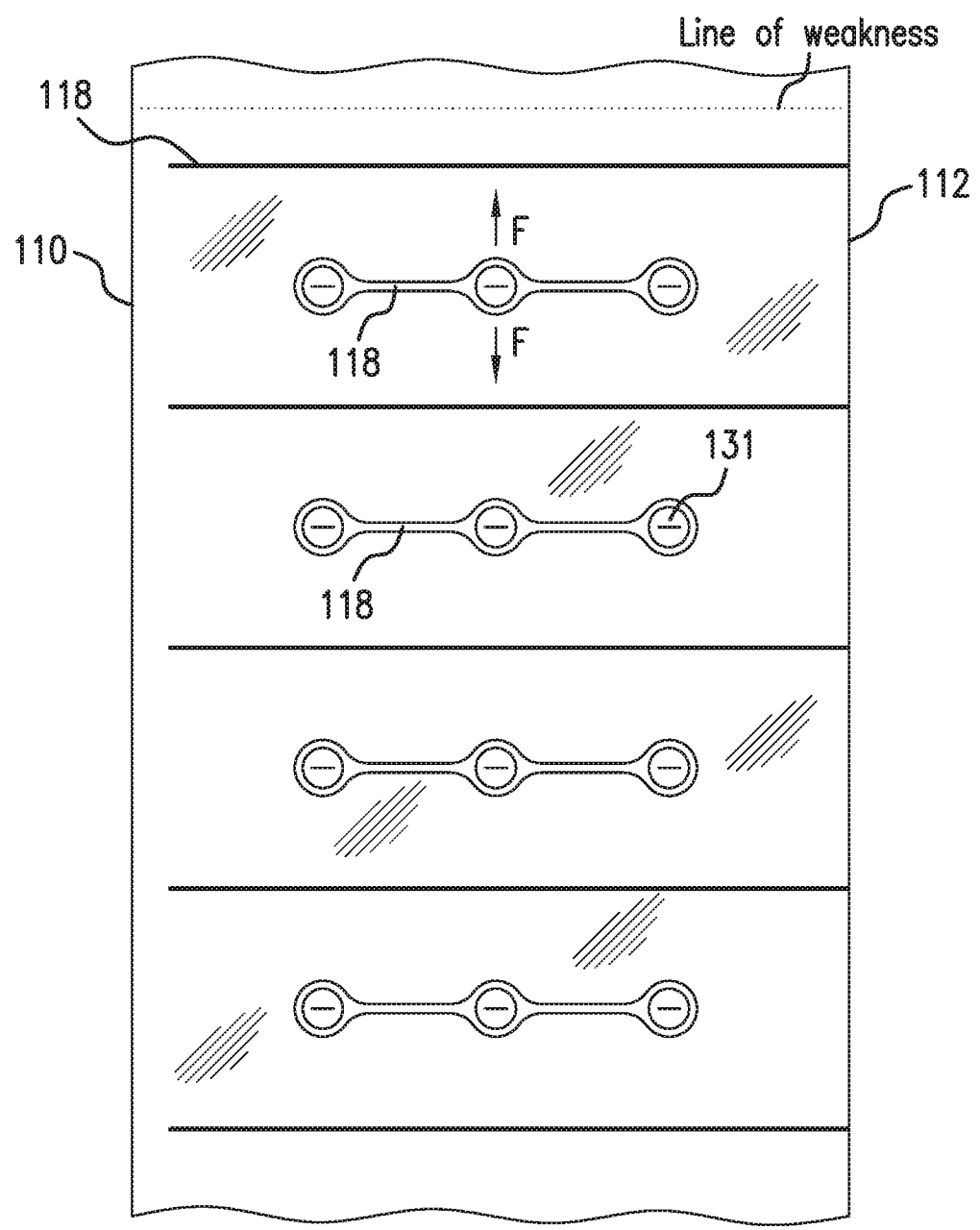
FIGS. 3C-D show views a flexible structure with intermediate seal portions, according to an embodiment.
Figure 3D:
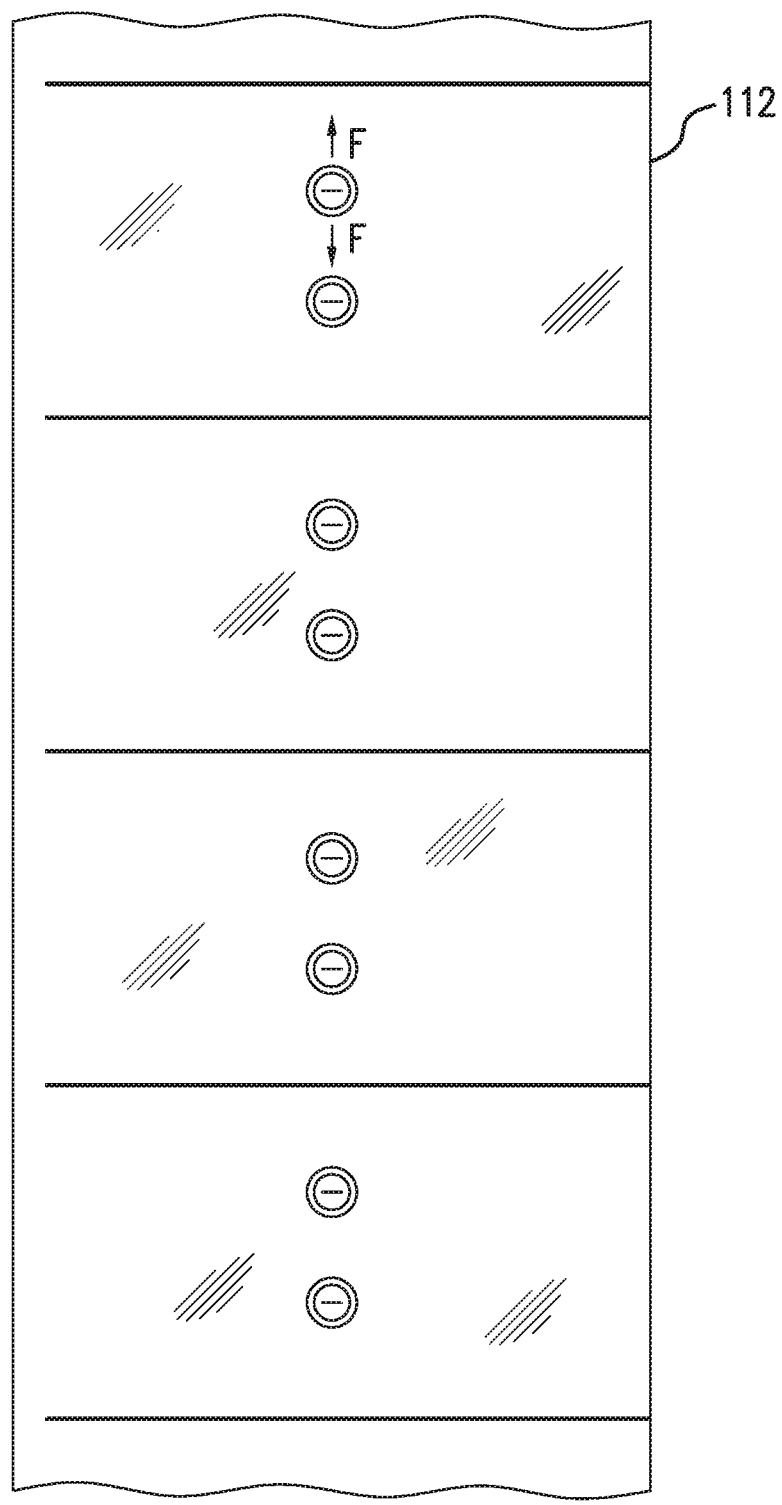

As shown in FIGS. 3C-3D the intermediate seal portions 129 may undergo forces F causing stress on the structure 100 during inflation, shipping, handling, packing, storage, bending, folding, expanding (e.g. being loaded or over loaded as a container) or other conditions the product faces. These forces may have a tendency to separate the permanent or non-permanent seals that hold the first layer and second layer of flexible structure 100 together. These forces may also have a tendency to cause tears in the inflation chambers at the various seals. The apertures may relieve stress from these longitudinal forces. These forces F may distort the flexible structure around the apertures, allowing the structure to shear, compress, or elongate in tension. The apertures may allow for localized increased distortion in the areas relieving these stress risers at the seals. This deformation may relieve stress risers at or proximal to the various seals. These distortions may reduce the likelihood of seal or wall failure. This may prevent or limit any seal separation and/or tearing into the inflation chambers. The local deformation may increase stresses on the apertures 131 which may be contained by the surrounding intermediate seal portions 129.

In accordance with various embodiments, the apertures may be any shape including die cut holes. For example, the apertures may be slits. The slits (i.e. a long cut forming the aperture wherein the width is negligible especially compared to the length and the slit ends in sharp transitions on either side) may form stress points on either end of the slit, which may have a tendency to cause the slits to tear. Intermediate seal portion 129 may limit this tendency and prevent or limit propagation of the tear between adjacent apertures and/or air chambers. The apertures may be circular which may include being a circle, generally round, oblong, elliptical, oval or having generally curved boundaries and/or limited sharp transitions between sides. Circular apertures 131 may present reduced tearing stresses on the aperture, but the intermediate seal portion 129 may still provide isolation from inflation chambers 120 and increased strength to keep the apertures 132 from tearing into the inflation chambers 120 and causing them to deflate.

In accordance with various embodiments, the flexible structure 100 may include an intermediate feature. The intermediate feature may be a portion of the flexible structure 100 without chambers and/or with interrupted chambers to form a functional element on the flexible structure. These functional elements may include movable panels, openings, windows, flat panels, printable panels, handles, attachment features, or the like. In one example, the intermediate feature may be an access panel 183. The access panel may include a separable boundary 185 that is operable to be separated from the remaining flexible structure 100. This separable boundary 185 may define the opening through the flexible structure 100 covered by the access panel 183. The separable boundary 185 may be any separable structure. For example, the separable boundary 185 may be a perforated border or a mixture of perforated boarder and resealable border. The perforated border may be operable to be easily torn from the flexible structure 100 at the separable boundary 185. In another example, the separable boundary 185 may be a resealable edge by utilizing, for example, a zipper seal (e.g. Ziploc-style closing). In another example, the separable boundary 185 may be an adhesive seal sometimes referred to as a pressure sensitive seal. In each of these examples the access panel 183 may be opened by separating separable boundary 185 from the rest of the flexible structure 100. The separable boundary may take any or form or shape. The separable boundary may be enclosed or open having free ends. For example, the separable boundary may be rectangular, circular, triangular, linear, etc. The separable boundary may allow the panel 183 to be opened like a door and allow the contents to be removed from the interior of container 50. For example, a grape could be removed.

The separable boundary 185 may be isolated from the chambers 120. For example, a seal 184 may be substantially parallel to or generally follow the separable boundary 185 at an offset distance. This offset may allow the seal 184 to separate from the chambers 120. In various embodiments, the seal 184 may be contiguousagious with seal 112. In other embodiments, the seal may be separate and internal to seal 112. The separable boundary 185 may be offset from the exterior of the first wall or the second wall (e.g. edges 102, 106, 104, 108 or seals 141, 142). The separable boundary 185 may start and end on portions internal to film 100. In this way the perforation does not tear out to the edge of the film 100 nor does the separable boundary 185 cause different portions of the structure to separate entirely. However, other weakened areas as discussed above may do this.

In accordance with various embodiments, a gripping portion may extend from the panel 183. The gripping portion may be an independent flap that protrudes from the surface of the flexible structure 100 at the panel 183. Alternatively, the gripping portion may be defined by a pre-separated portion of the separable boundary 185. Alternatively, the gripping portion may be defined by a portion of the perforation that is easily separated. The gripping portion may be operable to receive a force and transmit that force through the panel 183 to the separable boundary 185 such that the panel 183 is at least partially separated from the flexible structure 100.

In accordance with various embodiments, the panel 183 may include a hinge section. The hinge section may be defined by at least one edge of the panel 183 that is continuous with the rest of the flexible structure 100. For example, the at least one edge of the panel 183 does not have a separable boundary or any separating feature.

The separable boundary 185 may extend into or divide two portions of the same chamber. In some embodiments, the door chamber has passages so the door can be inflated. In some embodiments, the door has no inflation chamber but may have a flat widow for viewing or panel for printing labels onto. In accordance with various embodiments, seals 187a or 187b, as shown in FIG. 1. may be longitudinal seals or substantially longitudinal seals (e.g. may have a longitudinal component and transverse component to the direction), which interrupt one or more chambers 120d or extend one or more chambers 120n, 120p beyond an interruption. The interruption may prevent the one or more chambers 120d from extending the transverse width of the flexible structure 100. The extension may allow a new chamber 120n, 120p to pick up after the first chamber 120d was interrupted, thereby extending an inflated cushion the remaining transverse distance across the flexible material. A small gap 187c may reside between the interrupted chamber and the continued chamber. In this way, some chambers 120 may extend the transverse width of the flexible structure from end 124 to end 122. Some chambers 120n, 120p may only extend from or to seals 187a or some chambers 120d may only extend to 187b.

In accordance with various embodiments, seal 187b may transversely terminate the chamber 120d at an intermittent seal 128. The seal 187 may intersect with a transverse seal 118c. Intermittent seal 128 may be a folding feature between separate walls of container 50. The intermittent seal 128 may be discontinuous up to seal 187b which may be continuous. Thus intermittent seal 128 may allow the chambers 120 to inflate on both transverse sides of intermittent seal 128, whereas seal 187b may prevent or limit chambers 120d from extending beyond the seal 187b. Intermittent seal 128 and seal 187 may be positioned along any transverse position of flexible structure 100. For example, they may be positioned along a centerline such that the halves of the flexible structure 100 can be folded back over itself. In another example, they may be positioned a quarter of the way along the transverse distance allowing the flexible structure to have two folds to form container 50.

In accordance with various embodiments, a seal 187a may be a longitudinal seal that also intersects with transverse seal 118c. In various embodiments, transverse seal 118c may become discontinuous beyond the intersection of seal 187a. Beyond the intersection of seal 187a and 118c only wide portions 131 of seal 118c may be present. This discontinuous structure of transverse seal 118c may provide channels 119 to extend between chamber 120 and chambers 120n, 120p. Similar channels may extend between successive chambers 120n, 120p in a longitudinal direction. Seal 187a may be a longitudinal seal defining chambers 120n between panel 183 and intermittent seal 128. In this embodiment, a second seal may terminate chambers 120n. Or, seal 187a may be a seal defining an edge of panel 183 proximal to intermittent seal 128. In either embodiment, seal 187a may be continuous with seal 184 defining just the panel or the panel with the chambers 120n. In one embodiment, panel 183 may extend the whole width of one wall of container 50. In other embodiments, panel 183 may only extend a portion of the transverse distance across one wall of container 50 bounded on one or more sides by air chambers (e.g. chambers 120n). In the various embodiments, the channels 119 may allow chambers 120p within panel 183 to inflate. In this embodiment, the interior of the panel is in fluid communication with the inflation region, thereby providing a panel with an inflation region and the resulting protective functions.

By forming a break the chambers 120d and/or 120n with the intermediate seals 187a and b and/or other seals, the process of tearing the panel 183 off the opening at the perforation 185 does not deflate the adjacent inflated chambers 120, 120n or 120p.

As illustrated by these example embodiments, the flexible structure may include any variety of intermediate features, with the panel 183 being one example. Channels 119 and intermediate seals (e.g. 187a, b) may allow channels 120 to stop and continue on either side of the intermediate features. The channels 119 may also provide inflation into the intermediate feature if the intermediate feature is not bounded on all sides like panel 183. Another example of the intermediate feature is illustrated in FIGS. 10-12 as an uninflated flat surface 509. This flat surface 509 may be incorporated in any of the embodiments contemplated herein. For example, it may replace panel 183 by removing chambers 120p from the panel and forming the transverse seal below the panel as a continuous panel (e.g. 118c). In various embodiments, chamber boundaries may be formed around an enlarged uninflated portion. This un-inflated portion may be sufficiently large to form a viewing window or provide product information. This un-inflated portion may be greater than ½ inch by 2 inches, for example. In various examples, this un-inflated portion may be larger than other interruptions between chambers, such as the widened seal portions discussed above. However, the un-inflated portion may also be a seal between layers sufficiently large to serve a greater purpose than merely sealing. In this way the flat surface 509 would not be inflatable but may receive printing, labels, or other indicative information. The flat surface 509 may also be or alternatively be transparent, providing a window through the flexible film 100. This information presentation surface or window may be applicable to the flexible film 100 in its flat state as a divider or in a formed state such as the containers discussed herein.

In accordance with various embodiments, the flexible structure 100 may include a handle 150. The handle may be any area or opening operable to place a user's fingers through to hold the product. The handle may be provided by forming a weakened area or cutting an aperture through the flexible structure 100 in either a flat form or a structured form such as container 50. Handle 150 may be located proximal a transverse edge 149 of flexible structure 100. Handle 150 may be defined by one or more sealed portions of the flexible structure 100 operable to be utilized as a handle. In one example, an exterior handle seal 151 may be positioned proximal to a transverse edge/seal 149 or in another desired location. In various embodiments, separate exterior handle seals 151 may be positioned generally symmetrically about longitudinal centerline 128 or in another useful configuration. The handle 150 may include an interior handle seal 153 located within the one or more handle seals 151. A space between exterior handle seal 151 and the interior handle seal 153 may define a separable portion of the handle. In various embodiments, the separable portion may be a line of weakness 155, which may extend at least partially around the space between exterior handle seal 151 and the interior handle seal 153. The lines of weakness 155 may be broken, revealing an aperture through the film. When the symmetric handles 150 are overlapped, the apertures may align, creating a portion of container 50 that can be gripped as a handle.

As alluded to above, the flexible structure may be used in a flat configuration or it may be formed into container 50 (see e.g., FIG. 4). Container 50 may be formed from two separate sheets of flexible structure 100 sealed together or container 50 may be formed from a single sheet of flexible structure 100 that is folded and sealed together as illustrated in FIGS. 2A and 2B. The container 50 may also be structured from any number of sheets of flexible structure 100 forming more than two walls as the various application dictates. FIG. 2A illustrates a schematic of the flexible structure being folded in accordance with various embodiments. As discussed above, the flexible structure 100 may be folded along intermittent seal 128. This intermittent seal may be anywhere in any number, such that flexible structure 100 may be folded with any number of folds. In various embodiments, the flexible structure 100 may be folded along the centerline as illustrated in the example of FIG. 2A. Folding the flexible structure 100 in this way may allow the edges 102,106 and 104,108 to align. With the flexible structure 100 folded, the first wall and the second wall may be sealed along a plurality of seals. For example, as illustrated in FIG. 2B, these seals may include one or more of top seal 145, external longitudinal seal 142, internal longitudinal seal 141, and bottom seal 159. A second transvers seal similar to the seal 145 may additionally be formed along the transverse edge 149. The second transfer seal may be an alternative seal to seal 145. In some embodiments, the handles may also be sealed together at 150. These seals may be made after produce, or other content, has been placed in the container 50. The seals may be made with mechanical attachment (e.g. zip style), with heat, with an adhesive, or any other way known in the art. The first wall and the second wall of the container 50 may be sealed along adhesive seals shown in FIG. 2A. For example, seals on the first wall 50a may include one or more of seals 141a, 142a, 159a, 150a and 145a. Seals on the second wall 50b may include one or more of seals 141b, 142b, 159b, 150b and 145b. The seals may form the boundary around an unattached portion defining the interior 147 of the container 50. The interior 147 may receive the produce or other content. Seals 141a, 142a, 159a, 150a 145a, 141b, 142b, 159b, 150b and 145b are operable to connect walls which are made up of multiple plies of film. Thus these seals do not necessarily extend between plies 105, 107 but may do so. These seals may extend merely from ply 105 to ply 105 or ply 107 to ply 107, thus forming walls of the containers. It should be noted that in situation in which an adhesive is used, it may be placed on each of the "a" and "b" locations, such as 141a and 141b for example. The adhesive may be any kind of adhesive, such as, but not limited to, an ultraviolet (UV) curable adhesive. However it may be placed on only one of these locations such as 141a and when the structure 100 is folded 141a may align with 141b such that the seal is formed in both locations. This may apply to 142a,b 159a,b and 145a,b as well.

FIG. 4 illustrates packaged produce contained within an inflated flexible structure in accordance with various embodiments. As illustrated, quantities of the packaged produce 300 may be separated from one another by the flexible structure shown here as container 50. The chambers 120 provide protection to the produce 300. The apertures 131 provide venting to the produce 300. Tab 187 provides access to produce 300 as discussed above. Handle 150 allows carrying of produce 300.

In accordance with various embodiments, any produce may be packaged with the flexible structures 100. However, packaging certain produce with the flexible structures 100 may significantly extend the life of the produce. For example, produce with visco-elastic properties can be protected by the flexible structure 100, reducing damage that frequently occurs to the produce due to its structural properties. As damage also has a tendency to release certain gases such as ethylene, the venting in the flexible structure 100 may further benefit the produce by circulating the gasses away. This may be desirable in climacteric fruits which continue ripening after picking and thus are susceptible to accelerated ripening by ethylene. Leaves, such as lettuce, are also susceptible to this ripening process. By both reducing the bruising/damage to the produce and venting away ethylene, effects to the genes that make enzymes within the produce is reduced. The action of the enzymes to cause the ripening response is thereby reduced. Produce that may fall in these categories may include grapes, apples, lettuce, potatoes, onions, bananas, and others known in the art. Each container 50 may contain a ½ lb. of fruit to 5 lbs. of fruit. For example, each container may contain about ½ lb to 2 lbs of fruit.

FIGS. 5A-B illustrate group packaged produce contained within a plurality of inflated flexible structures in accordance with various embodiments. As illustrated, the flexible structure 100 may be formed into containers 50a,b,c. These containers may be packaged together into a single bundle. FIG. 5A illustrates two containers 50a,b combined together with a single structural handle 51 adding support to the handle. The structural handle 51 may be cardboard, plastic or any other known shipping material that may hold multiple containers together and add support to the handle. The structural handle 51 may also serve as a label surface for identification and information purposes. FIG. 5B illustrates a chain of tree containers 50a,b,c, combined together. In various embodiments, the flexible structures can be filled and sealed without separating them from one another. FIG. 1 shows two connected flexible structures 100a, 100b. By filling and sealing the connected flexible structures, a chain of connected containers 50a,b,c may be formed. This may simplify shipping and purchasing aspects of the industry. Alternatively, the structures may be separated then reconnected via structural handles 51a,b,c.

The packaged produce may then be shipped, contained, or displayed in bulk containers. FIG. 6A-B illustrates packaged produce contained within a plurality of inflated flexible structures and stored in crates in accordance with various embodiments. With the containers 50 protecting the produce, the produce may be able to be stacked deeper in a crate such as shown in FIG. 6B. In this way, produce can be shipped, contained and displayed in larger containers allowing additional efficiencies in the industry.

Figure 7:
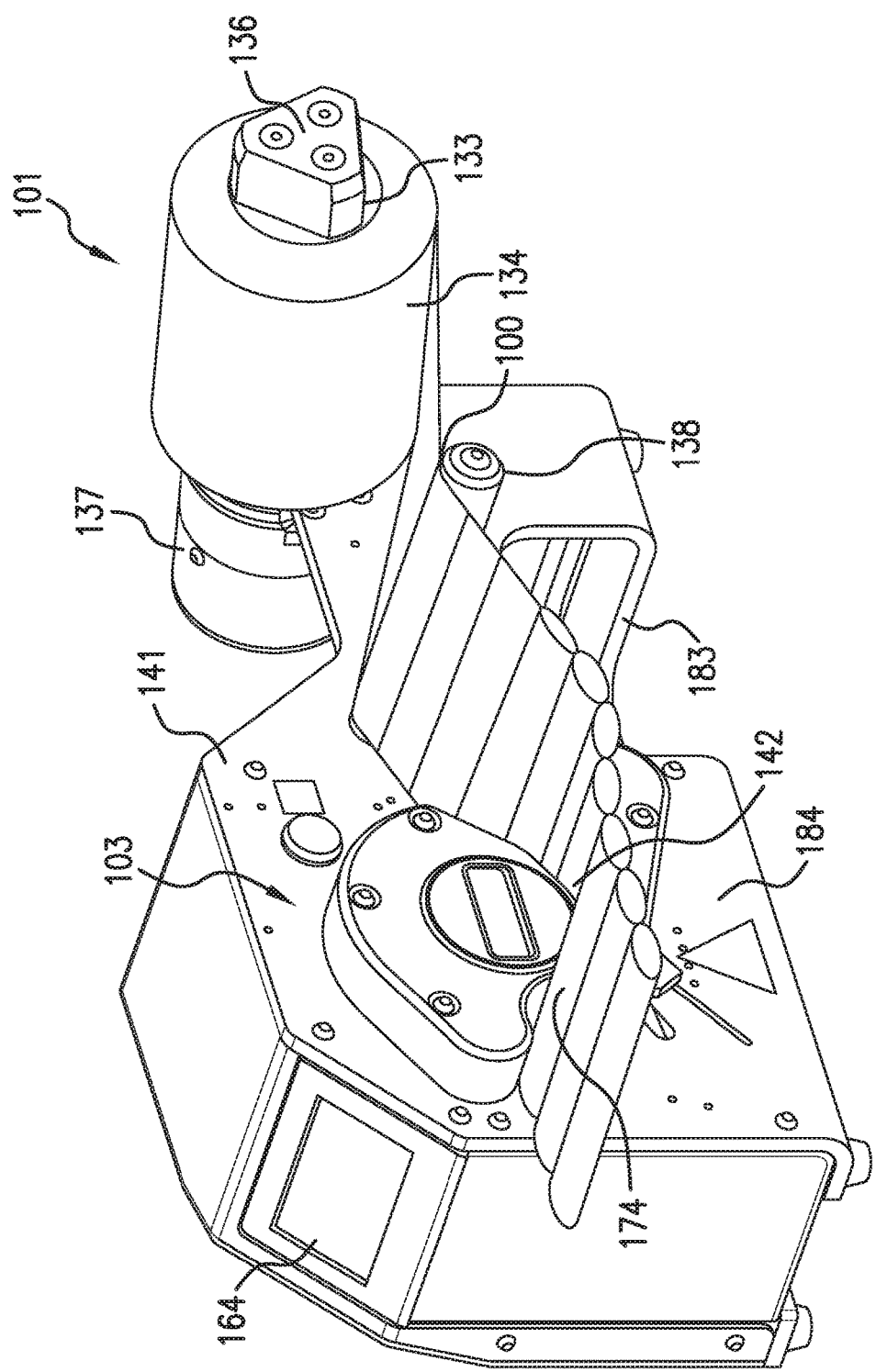
FIG. 7 shows an example inflatable packaging sealing device for use in sealing the flexible structures.

FIG. 7 illustrates an example of an inflatable packaging sealing device 101 for use in sealing the inflatable flexible structures. the inflation and sealing device 101 may be operated to convert a flexible structure 100 of uninflated material into a series of inflated pillows or cushions by inflating chambers 120. As shown in FIG. 7, the uninflated web 100 can be a bulk quantity of supply, uninflated material. For example, uninflated flexible structure 100 may be provided in bulk form on a roll to be inflated and sealed by the device 101. For example, the bulk quantity of uninflated material may be a roll of the material 134. The flexible structure 100 may be rolled around an inner support tube 133.

The inflation and sealing device 101 may include a bulk material support 136. The bulk quantity of uninflated material may be supported by the bulk material support 136. For example, the bulk material support may be a tray operable to hold the uninflated material, which can be provided by a fixed surface or a plurality of rollers, for example. To hold a roll of material the tray may be concave around the roll or the tray may convex with the roll suspended over the tray. The bulk material support may include multiple rollers which suspend the web. The bulk material support may include a single roller that accommodates the center of the roll of web material 134. The roll of the material 134 may be suspended over the bulk material support 136, such as a spindle passing through the core 133 of the roll of the material 134. Typically, the roll core is made of cardboard or other suitable materials.

In accordance with various embodiments, the nozzle may inflate web 100 not only at a transverse edge but may engage an inflation channel located at any transverse distance between the longitudinal edges; i.e., the inflation and sealing device 101 fills a central channel with chambers on both transverse sides of the inflation channel. The web 100 may roll off of material support 136 and over guide 138 in a manner that aligns such a central inflation channel 114 of the flexible structure 100 with the nozzle in inflation area 142.

The inflation and sealing device 101 may be configured for continuous inflation of the web 100 as it is unraveled from the roll 134. The roll 134 includes the plurality of inflation chambers 120 that are arranged in series. To begin manufacturing of the inflated pillows from the web material 100, the inflation opening 116 of the web 100 is inserted around an inflation assembly, such as an inflation nozzle in inflation region 142. The web 100 is advanced over the inflation nozzle with the chambers 120 extending transversely with respect to the inflation nozzle and an outlet on the inflation nozzle. The outlet, which can be disposed on a radial side and/or the upstream tip of the nozzle, for example, directs fluid from a nozzle body into the chambers 120 to inflate the chambers 120 as the web 100 advances along the material path in a longitudinal direction. The inflated web 100 is then sealed by a sealing mechanism in the sealing area 174 to form a chain of inflated pillows or cushions.

The inflation nozzle inserts fluid, such as pressured air, along a fluid path into the uninflated web material through nozzle outlets, inflating the material into inflated pillows or chambers 120. The inflation nozzle can include a nozzle inflation channel that fluidly connects a fluid source with the nozzle outlets. It is appreciated that in other configurations, the fluid can be other suitable pressured gas, foam, or liquid. The web 100 is fed over the inflation nozzle, which directs the web to the inflation and sealing assembly 103. The web 100 is advanced or driven through the inflation and sealing device 101 by a drive mechanism, such as by a driver or sealing drum or the drive roller, in a downstream direction along a material path.

After being fed through the web feed area 164, the first and second plies 105,107 are sealed together by the sealing assembly and exit the sealing drum. The sealing drum may include heating elements, such as thermocouples, which melt, fuse, join, bind, or unite together the two plies 105,107, or other types of welding or sealing elements. The web 100 is continuously advanced through the sealing assembly along the material path and past the sealing drum at a sealing area 174 to form a continuous longitudinal seal along the web by sealing the first and second plies 105,107 together, and exits the sealing area. In various embodiments, the inflation and sealing device 101 further includes a cutting assembly to cut the web off the inflation nozzle when an inflation channel that receives and is closed around a longitudinal inflation nozzle is used.

In accordance with various embodiments, the inflation and sealing device can have more than one belt. For example, one belt may drive the various rollers and a second belt may pinch the web against the sealing drum. In various embodiments, the inflation and sealing device may have no belts. For example, the sealing drum may pinch the web against a stationary platform and drive the web thorough the inflation and sealing device at the same time.

In accordance with various embodiments, these components and other components which may be utilized within an inflation and sealing device 101 including without limitation, the nozzle, blower sealing assembly, and drive mechanisms, and their various components or related systems may be structured, positioned, and operated as disclosed in any of the various embodiments described in the incorporated references such as, for example, U.S. Pat. No. 8,061,110; U.S. Pat. No. 8,128,770; U.S. Patent Publication No. 2014/0261752; and U.S. Patent Publication No. 2011/0172072 each of which is herein incorporated by reference. Each of the embodiments discussed herein may be incorporated and used with the various sealing devices of the incorporated references and/or other inflation and sealing devices. For example, any mechanism discussed herein or in the incorporated references may be used in the inflation and sealing of flexible structure 100 as the web or film material described in the incorporated references.

As discussed above, the flexible structure may be heat sealed or adhesive sealed. Furthermore, the flexible structure may be folded into forming the first and second walls of the container, which may be sealed together by heat sealing or adhesive sealing. Alternatively, the first wall and the second wall may be formed as separate flexible structures which may be sealed together by heat sealing or adhesive sealing. As such, the mechanisms and processes above for heat sealing are not intended to limit the scope but merely provide explanation of example processes and devices for performing the task. Adhesive sealing of the flexible structure or the walls forming the container may be performed by any method known in the art.

Figure 8:
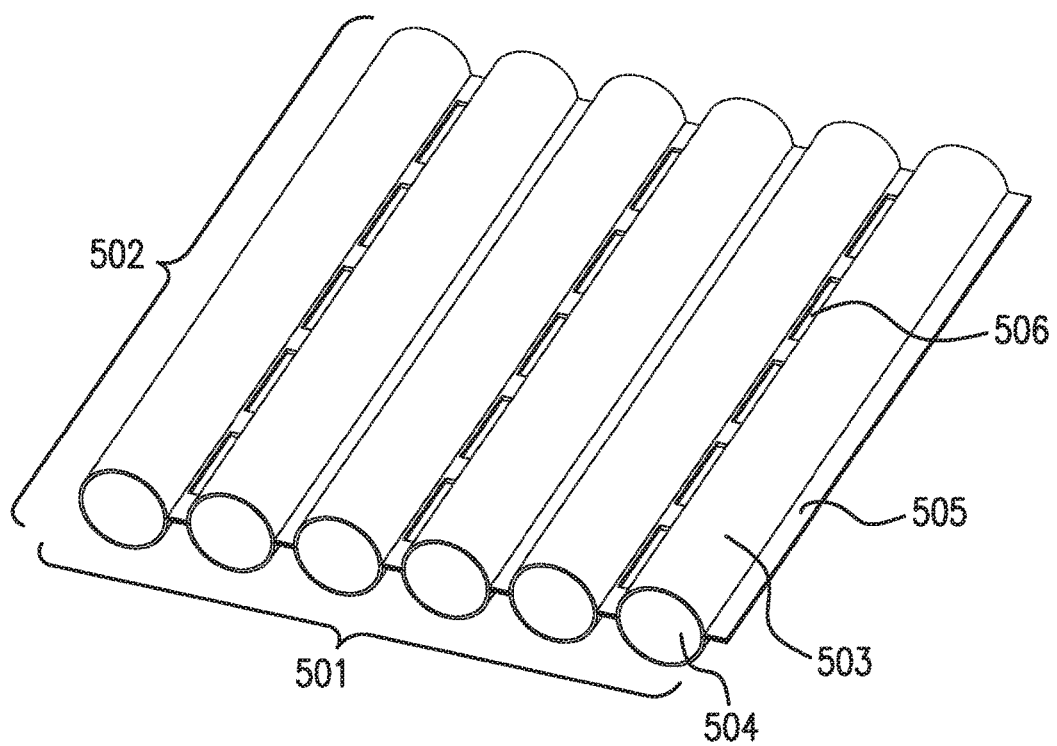
FIG. 8 shows a section of the flexible structure showing a cross section through the transverse seals and inflation chambers in accordance with various embodiments.

In accordance with one embodiment, as shown in the example FIG. 8 which illustrates a cross section through an inflated chamber, a section of the inflatable container 501 may include inflatable chambers 501. Inflatable chambers 501 may vary in length to support various shapes. The inflatable chambers 501 may be a length 502 which may be suitable to form any side of container such as a produce container. The length 502 may increase or decrease depending on the shape. For example, length 502 may be sufficiently long to wrap around the perimeter of a designed quantity of produce. An outer surface 503 may contact the produce and separate each package from the other. An inner volume 504 of the structure may hold the inflation gases. The gases may add rigidity to the chamber 501, thereby doubling as a structural member. The inflated chambers 501 may also serve as a thermal barrier to extend the produce shelf life of the product. A seal 505 may be welded together using a heated element. A series of apertures 506 may be provided through the seal 505 such that the produce may be vented of gases or the produce may be watered down during transit and point of sale through the apertures. The apertures may be close together but have rounded ends so as to limit or prevent propagations of tears between one another.

Figure 9:
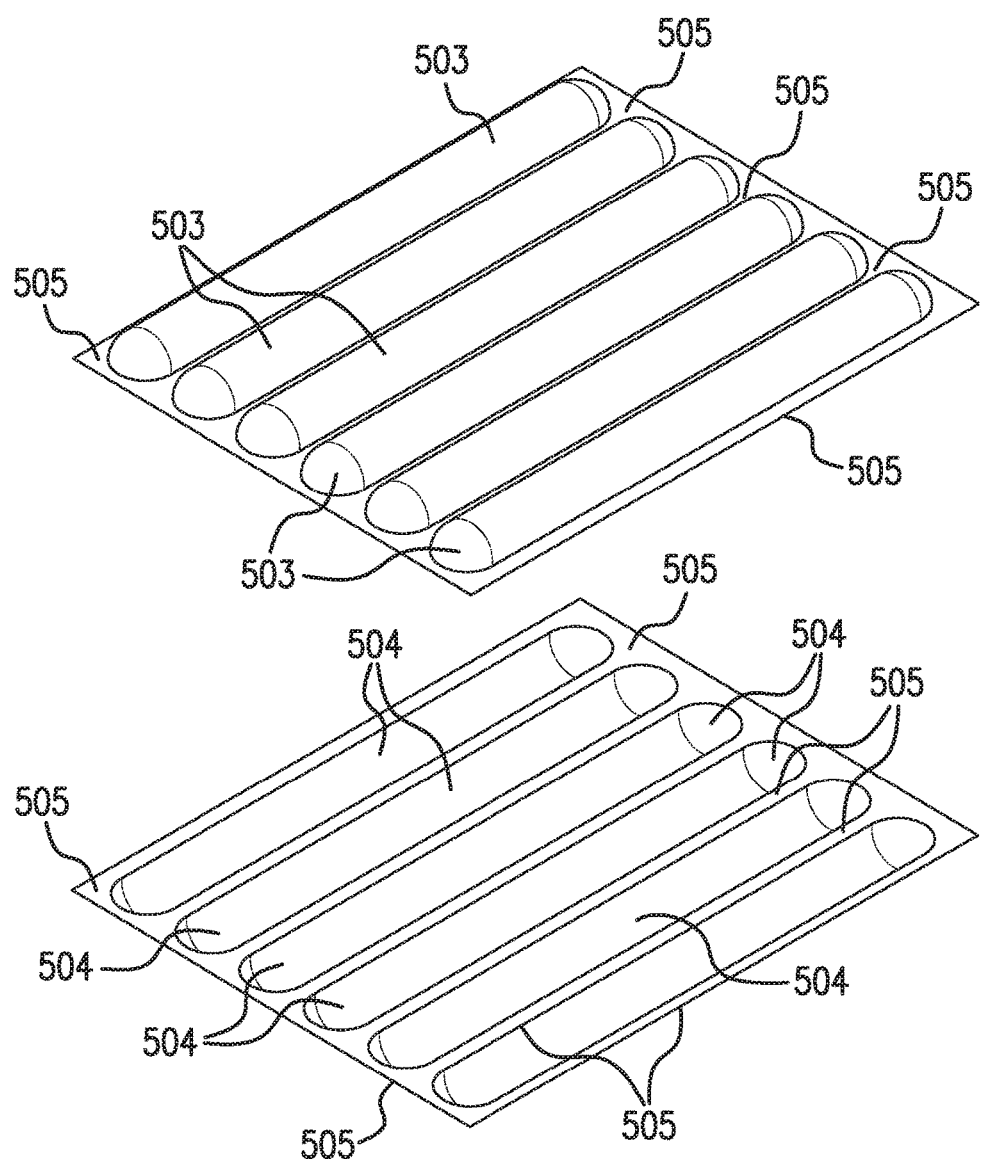
FIG. 9 shows film sheets that are embossed or otherwise formed to create a structural/thermal shape in accordance with various embodiments.

FIG. 9 illustrates film sheets that are embossed to create a structural shape in accordance with various embodiments. Two plies may be sealed and trap air between the two. This assembly may be used as a wall of a container or divider for protecting contents such as produce. Multiple sheets can be combined to form a container. Chamber ends 503 may be provided to seal off ends of the chambers. As shown in FIG. 9, the two sheet halves may be formed separately and then heat sealed together.

Figure 10A:
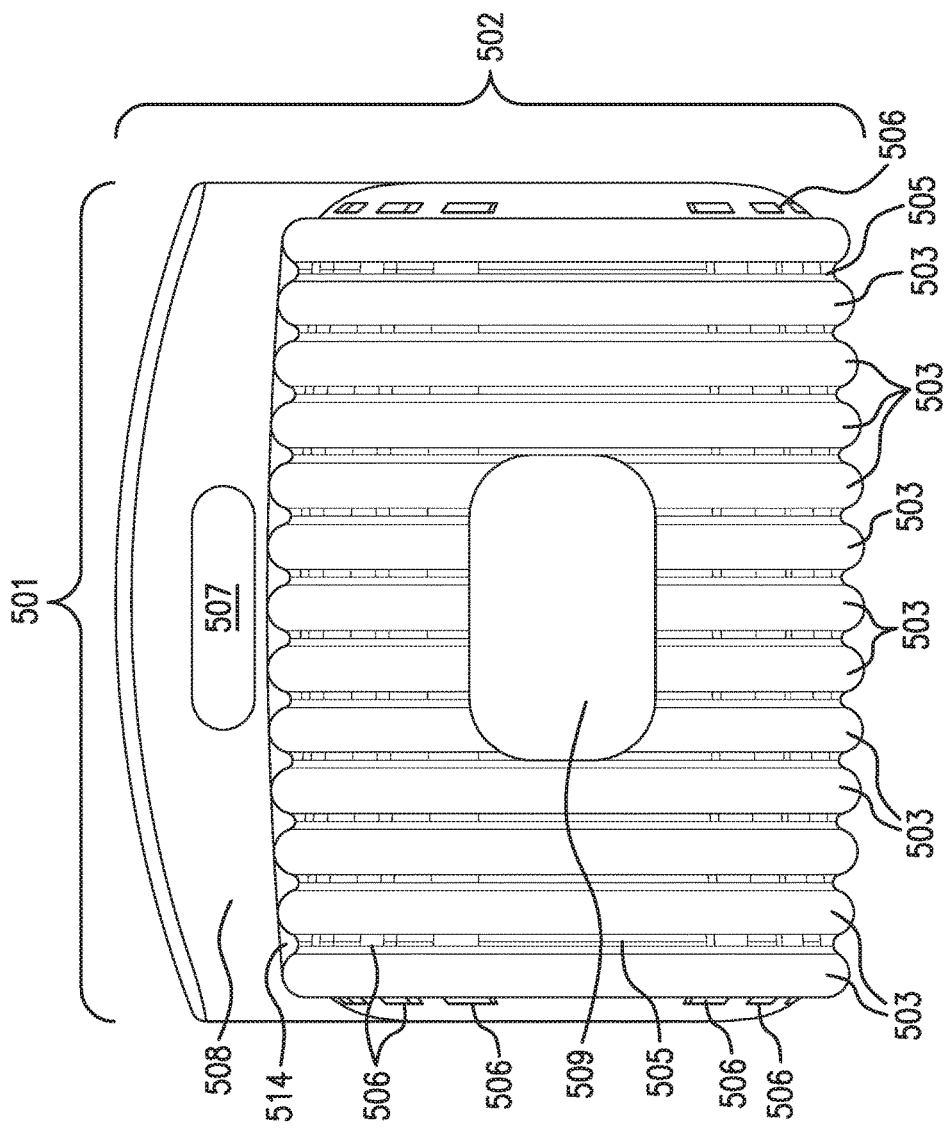
FIGS. 10A-B show packaging structures in accordance with various embodiments.
Figure 11:
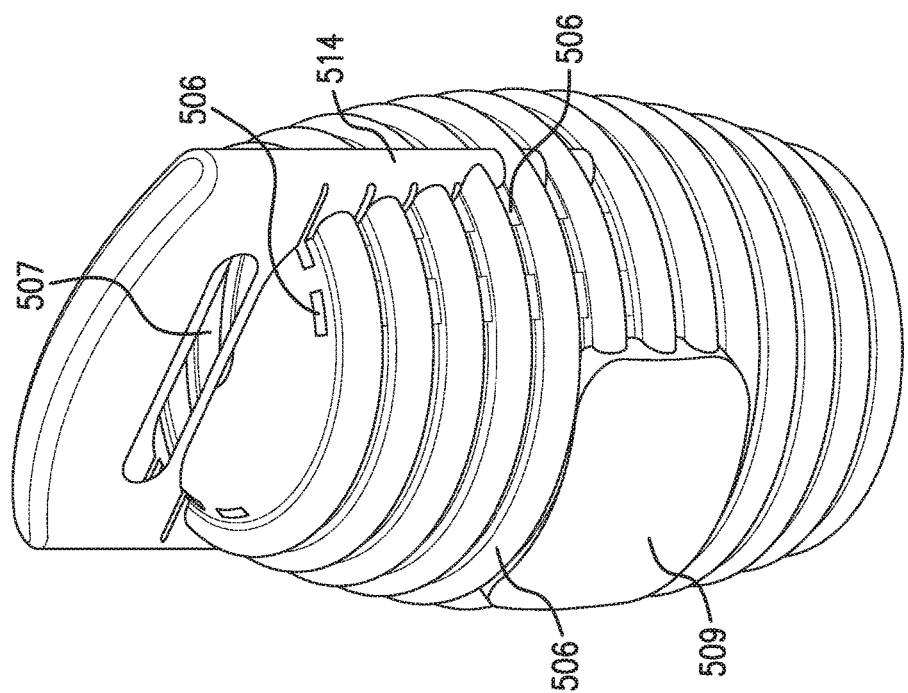
FIG. 11 show packaging structures in accordance with various embodiments.
Figure 10B:
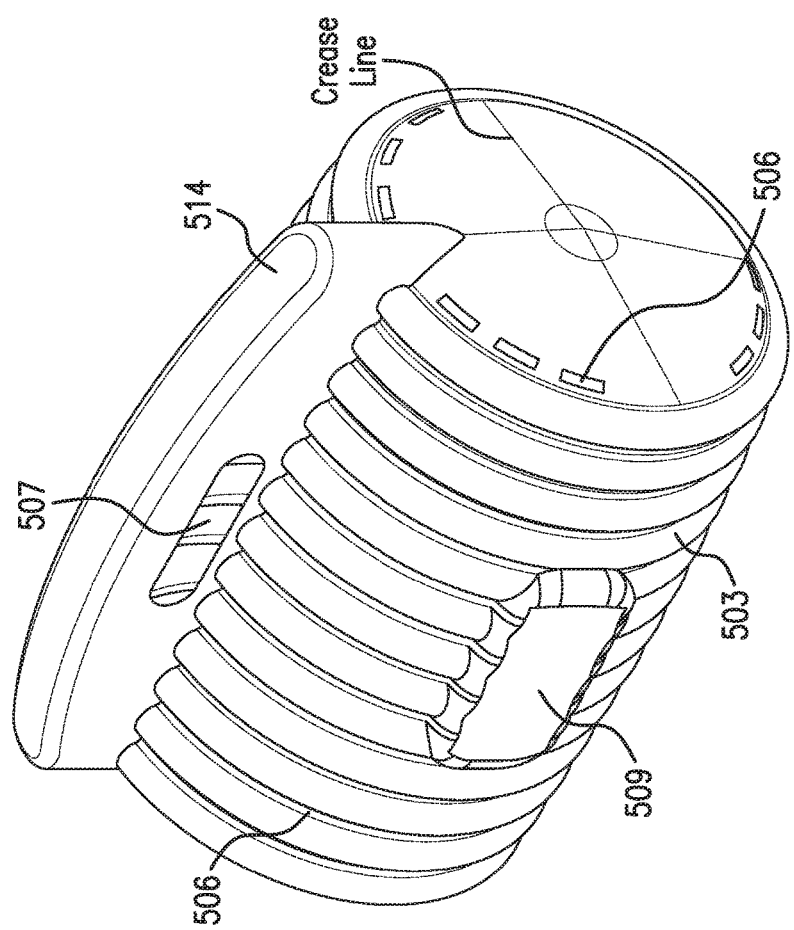

In accordance with various embodiments, as shown in FIGS. 10A-B which illustrate packaging structures formed as a container, the chambers 501 may be formed as circular hoops defining an interior storage area of the container. In various embodiments a flat flexible structure may be bend into the circular shape of FIGS. 10A-B. The inflation channel 514 may run proximal to the handle 507. End caps 506 may be applied to contain the sides of the container. An intermediate feature 509 may be formed on one side of the container by interrupting the chambers 501. The feature may be a flat label, a window, an access point or the like. The feature 509 may be flat so as to reduce distortion of the label or transmission of light through a window. A handle 507 may be included as a termination point for the chambers 501. The chamber ends 503 may be positioned at the base of the container. A side panel 505 may be sealed onto the flexible structures forming the chambers 503. The separate side panel may provide the cylindrical shape to the flexible structures forming the chambers 503.

In accordance with various embodiments, as shown in FIGS. 10A-B and 11 which illustrate alternatives to the packaging structures, the chambers can be arranged to provide a variety of shipping structures. FIG. 10B illustrates chambers that are vertical or perpendicular to the handle 507. The crease lines show in the side wall are formed by bringing the structure from a flat form to the 3-demensional form. FIG. 11 illustrates chambers that are horizontal or parallel to the handle 507.

Any and all references specifically identified in the specification of the present application are expressly incorporated herein in their entirety by reference thereto. The term "about," as used herein, should generally be understood to refer to both the corresponding number and a range of numbers. Moreover, all numerical ranges herein should be understood to include each whole integer within the range.

The various embodiments discussed herein provide a cost-competitive super structure that may be able to replace corrugated cardboard. The various embodiments discussed herein are able to drain water when cleaning and packaging produce and improve the end product. Furthermore, the various embodiments discussed herein improve efficiency of manufacture. For examples, the various embodiments discussed herein may provide as pre-inflated "bags on a reel" used to take off the reel for simplicity, automation, and compaction, or the various embodiments discussed herein may be provided as uninflated material on a reel ready to be inflated and sealed on site to reduce shipping bulk of the packaging products. The various embodiments discussed herein also lend themselves to simplified printing and/or advertising on the product packaging. The various embodiments discussed herein provide a protective barrier that is able to minimize damage to the product being shipped. As the spoilage of produce is directly related to bruising and trapping of certain gasses, the various embodiments discussed herein are able to address both these issues and prolong the life of the produce.

What is claimed is:

1. An inflatable packaging element, comprising:
   first and second film plies sealed to each other by a seal pattern to cooperatively form a flexible structure;
   wherein the seal pattern includes an adhesive seal and a heat seal and defines between the first and second plies:
      a plurality of inflation chambers that are inflatable with and configured to contain a fluid, each of the chambers defining an opening configured to receive the fluid into the chamber; and
      an inflation region that extends along the plies and is fluidly connected with the openings to inflate the chambers therethrough;
   wherein the heat seal and the adhesive seal intersect.

2. The inflatable packaging element of claim 1, wherein the adhesive is a UV curable adhesive.

3. The inflatable packaging element of claim 1, wherein the adhesive has a Brookfield Viscosity between about 700-1000 cps at 77 degrees Fahrenheit.

4. The inflatable packaging element of claim 1, wherein the inflation region is a channel having an enclosed periphery.

5. The inflatable packaging element of claim 1, wherein the seal pattern defining the plurality of inflation chambers extends generally transversely across the plies.

6. The inflatable packaging element of claim 1, wherein the inflation region is an open lateral edge defining at least one flap.

7. The inflatable packaging element of claim 1, wherein the inflation region is open to an exterior of the packaging element to receive the fluid and direct the fluid to the openings.

8. The inflatable packaging element of claim 1, wherein the heat seal is applied over and across the adhesive seal.

9. The inflatable packaging element of claim 1, wherein a portion of the seal pattern that defines the inflation chambers includes the intersection of the heat seal and the adhesive seal.

10. The inflatable packaging element of claim 1, wherein a heat seal applied across the openings of the chambers seals the chambers from the inflation region, thereby crossing over the adhesive seal.

11. The inflatable packaging element of claim 10, wherein the openings of the chambers are generally aligned longitudinally and the heat seal is applied longitudinally.

12. A method of producing an inflatable packaging element, comprising:
    adhering together first and second film plies to provide a seal pattern therebetween, such that the plies cooperatively form a flexible structure, the seal pattern being formed at least partially using an adhesive configured such that the seal pattern defines a plurality of inflation chambers between the first and second plies that are inflatable with and configured to contain a fluid, and
    heat sealing the plies across the adhesive of the seal pattern to seal the inflation chambers to retain the fluid therein.

13. The method of claim 12, further comprising curing the adhesive with a UV light.

14. The method of claim 12, wherein the seal pattern defines an inflation region that is fluidly connected to the inflation chambers to inflate the chambers, and the plies are heat sealed across the adhesive of the seal pattern to seal the inflation chambers from the inflation region.

15. The method of claim 14, further comprising inflating the inflation chamber with fluid that enters from the inflation region.

16. The method of claim 14, wherein the inflation region extends longitudinally along the plies and the seal pattern defining the inflation chamber extends generally transversely across the plies.

17. The method of claim 12, wherein the seal pattern is constructed substantially of adhesive.

18. An inflatable packaging element, comprising:
    a first wall defined by a first film ply and a second film ply that is sealed to the first ply by one or more ply seals, wherein the one or more ply seals define an inflation chamber between the first and second plies, and wherein the inflation chamber is inflatable with and configured to contain a fluid;
    a second wall; and
    one or more wall seals that seal the second wall to the first wall on a side of the first wall exterior to the chamber to form a container and define a containment space between the first and second walls to receive an article therein,
    wherein at least a first seal of the one or more ply seals or the one or more wall seals is formed using an adhesive, and a second seal of the one or more ply seals or the one or more wall seals is formed by heat sealing across said first seal.

19. The inflatable packaging element of claim 18, wherein the adhesive is a UV curable adhesive.

20. The inflatable packaging element of claim 18, wherein the one or more ply seals are formed using the adhesive.

21. The inflatable packaging element of claim 18, wherein the one or more wall seals are formed using a heat-sealing technique.

22. The inflatable packaging of claim 18, wherein the adhesive has a Brookfield Viscosity between about 700-1000 cps at 77 degrees Fahrenheit.

23. The inflatable packaging element of claim 18, wherein the second wall is defined by third and fourth film plies connected to each other at another one or more another ply seals that define therebetween another inflation chamber that is inflatable with and operable to contain the fluid.

24. The inflatable packaging element of claim 18, wherein the first and second film plies form a continuous wall, and wherein the first wall and the second wall are formed by folding the continuous wall in a c-fold.

25. The inflatable packaging element of claim 18, comprising at least one intermediate seal between the first film ply and the second film ply, the at least one intermediate seal configured to create a bendable line in the inflation chamber when the chamber is inflated.

26. The inflatable packaging element of claim 18, wherein the one or more wall seals define a boundary on three sides of the containment space and one side of the space is open.

27. The inflatable packaging element of claim 18, wherein at least one of the one or more ply seals is formed using an adhesive and at least one of the one or more wall seals is formed using heat.

28. The inflatable packaging element of claim 18, wherein at least one of the one or more ply seals is formed using heat and at least one of the one or more wall seals is formed using an adhesive.

29. A method of producing an inflatable packaging element, comprising:
    sealing a first film ply and a second film ply together with one or more ply seals to form an inflation chamber therebetween and create a first wall;
    inflating the inflation chamber with a fluid such that the fluid is contained within the inflation chamber, and
    sealing the first wall to a second wall with one or more wall seals on a side of the first wall that is exterior to the chamber to form a bag that defines an interior containment space between the first and second walls to receive an article therein; and
    wherein at least a first seal of the one or more ply seals or the one or more wall seals is formed using an adhesive, and a second seal of the one or more ply seals or the one or more wall seals is formed by heat sealing across said first seal.

30. The method of claim 29, further comprising curing the adhesive with a UV light.

31. The method of claim 29, wherein the one or more ply seals are formed using the adhesive.

32. The method of claim 29, wherein the one or more wall seals are formed using a heat-sealing technique.

33. The method of claim 29, wherein scaling the first ply to the second ply comprises placing the adhesive on the first ply and then placing the second ply on the first ply with the adhesive.

\* \* \* \* \*